US012786904B2

(12) United States Patent
Ke

(10) Patent No.: US 12,786,904 B2

(45) Date of Patent: Nov. 3, 2026

(54) INFORMATION CONTROL METHOD AND APPARATUS, AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 238 days.

(21) Appl. No.: 18/100,519

(22) Filed: Jan. 23, 2023

(65) Prior Publication Data

US 2023/0164713 A1 May 25, 2023

Related U.S. Application Data

(63) Continuation of application No. PCT/CN2021/108165, filed on Jul. 23, 2021.

(30) Foreign Application Priority Data

Jul. 24, 2020 (CN) ......................... 202010726051.8

(51) Int. Cl.
*H04W 56/00* (2009.01)
*H04J 3/06* (2006.01)

(52) U.S. Cl.
CPC ......... *H04W 56/001* (2013.01); *H04J 3/0658* (2013.01)

(58) Field of Classification Search
CPC ............. H04W 56/001; H04W 56/0015; H04J 3/0658; H04J 3/0667; H04J 3/0641;
(Continued)

(56) References Cited

U.S. PATENT DOCUMENTS 8,311,054 B2 11/2012 Terasawa et al.
9,429,983 B1 * 8/2016 Chall ........................ G06F 1/10
(Continued)

FOREIGN PATENT DOCUMENTS

CN 101854358 A * 10/2010
CN 102195735 A * 9/2011 ............ H04J 3/0641
(Continued)

OTHER PUBLICATIONS

Extended European Search Report for Application No. 21845744.8, dated Dec. 1, 2023, 15 Pages.
(Continued)

*Primary Examiner* — Sujoy K Kundu
*Assistant Examiner* — Vladislav Y Agureyev
(74) *Attorney, Agent, or Firm* — BROOKS KUSHMAN P.C.

(57) ABSTRACT

An information control method and apparatus, and a communications device are provided. The information control method includes: receiving a first message, where the first message is a message including information about a first root object; and performing a first operation; where the first operation includes at least one of the following: generating a message priority vector based on a first port and/or the first message; generating a path priority vector of the first root object based on the first port, the first message, and/or a path cost of a receiving port, or generating a path priority vector of the first root object based on the message priority vector and/or a path cost of a receiving port; sending first root information to a first target end; and replacing a port priority vector of the first port with the message priority vector.

19 Claims, 10 Drawing Sheets

(58) Field of Classification Search
CPC ............. H04L 45/3065; H04L 47/2416; H04L 47/2425; H04L 47/2466; H04L 47/2491; H04L 47/28
See application file for complete search history.

(56) References Cited

U.S. PATENT DOCUMENTS

| | | | | |
|---|---|---|---|---|
| 9,645,603 | B1 * | 5/2017 | Chall | G06F 1/10 |
| 11,516,078 | B2 * | 11/2022 | Moon | H04W 72/0446 |
| 12,289,160 | B2 * | 4/2025 | Li | H04J 3/0661 |
| 12,439,349 | B2 * | 10/2025 | Munz | H04J 3/0667 |
| 2009/0213870 | A1 * | 8/2009 | Terasawa | H04L 12/417 370/442 |
| 2018/0006955 | A1 * | 1/2018 | Bush | H04L 47/24 |
| 2018/0007647 | A1 * | 1/2018 | Bilstad | H04W 56/0015 |
| 2020/0259896 | A1 * | 8/2020 | Sachs | H04L 67/12 |
| 2021/0099341 | A1 * | 4/2021 | Moon | H04W 76/10 |
| 2021/0212069 | A1 * | 7/2021 | Moon | H04W 72/56 |
| 2021/0328698 | A1 | 10/2021 | Lv et al. | |
| 2021/0329584 | A1 * | 10/2021 | Prakash | H04W 72/1268 |
| 2021/0345157 | A1 | 11/2021 | Ke et al. | |
| 2021/0359778 | A1 * | 11/2021 | Wang | H04L 69/28 |
| 2021/0367695 | A1 * | 11/2021 | Moon | H04W 8/24 |
| 2022/0030530 | A1 * | 1/2022 | Munz | H04J 3/0667 |
| 2022/0030533 | A1 * | 1/2022 | Munz | H04W 56/005 |
| 2022/0174625 | A1 * | 6/2022 | Xiong | H04W 48/18 |
| 2022/0174631 | A1 * | 6/2022 | Xiong | H04W 76/30 |
| 2022/0224430 | A1 * | 7/2022 | Nakayasu | H04J 3/0658 |
| 2022/0239398 | A1 * | 7/2022 | Li | H04J 3/0644 |
| 2022/0286913 | A1 * | 9/2022 | Ke | H04W 28/10 |
| 2022/0311533 | A1 * | 9/2022 | Wang | H04L 69/28 |
| 2022/0338142 | A1 * | 10/2022 | Minokuchi | H04W 56/0015 |
| 2022/0353834 | A1 * | 11/2022 | Qiang | H04L 12/4633 |
| 2022/0361129 | A1 * | 11/2022 | Fan | H04W 56/0045 |
| 2022/0393784 | A1 * | 12/2022 | Li | H04J 3/0682 |
| 2022/0394647 | A1 * | 12/2022 | Moon | H04J 3/0667 |
| 2023/0075078 | A1 * | 3/2023 | Qiang | H04W 72/0446 |
| 2023/0083152 | A1 * | 3/2023 | Fu | H04W 56/0015 370/350 |
| 2023/0090268 | A1 * | 3/2023 | Moon | H04J 3/0641 370/254 |
| 2023/0091501 | A1 * | 3/2023 | Lv | H04L 41/0806 |
| 2023/0092723 | A1 * | 3/2023 | Qu | H04W 56/001 370/235 |
| 2023/0129885 | A1 * | 4/2023 | Jerichow | H04W 12/106 726/1 |
| 2023/0156517 | A1 * | 5/2023 | Li | H04L 47/24 370/328 |
| 2023/0164626 | A1 * | 5/2023 | Huang | H04W 28/065 370/252 |
| 2023/0171014 | A1 * | 6/2023 | Patel | H04W 72/23 370/503 |
| 2023/0299865 | A1 * | 9/2023 | Wang | H04L 69/28 370/503 |
| 2024/0214098 | A1 * | 6/2024 | Moon | H04J 3/0667 |

FOREIGN PATENT DOCUMENTS

| | | | | | |
|---|---|---|---|---|---|
| CN | 101938318 | B | * | 2/2013 | H04L 12/42 |
| CN | 103139080 | A | | 6/2013 | |
| CN | 103634208 | A | | 3/2014 | |
| CN | 104052589 | A | * | 9/2014 | H04J 3/0641 |
| CN | 107046449 | A | | 8/2017 | |
| CN | 107888315 | B | * | 6/2019 | H04J 3/0638 |
| CN | 111277993 | A | | 6/2020 | |
| CN | 111385051 | A | | 7/2020 | |
| CN | 113271653 | A | * | 8/2021 | H04J 3/0638 |
| CN | 113708869 | A | * | 11/2021 | H04J 3/0658 |
| CN | 113709856 | A | * | 11/2021 | |
| CN | 113747512 | A | * | 12/2021 | H04W 28/0268 |
| CN | 115021852 | A | * | 9/2022 | H04J 3/0658 |
| CN | 115552814 | A | * | 12/2022 | H04J 3/0641 |
| CN | 115021852 | B | * | 11/2023 | H04J 3/0661 |
| CN | 111490842 | B | * | 8/2024 | H04J 3/0638 |
| EP | 3522461 | A1 | | 8/2019 | |
| WO | 2017198304 | A | | 11/2017 | |
| WO | WO-2021147090 | A1 | * | 7/2021 | H04W 56/0015 |
| WO | WO-2021219227 | A1 | * | 11/2021 | H04L 47/28 |
| WO | WO-2021243614 | A1 | * | 12/2021 | |
| WO | WO-2022218500 | A1 | * | 10/2022 | G06N 20/20 |

OTHER PUBLICATIONS

Institute of Electrical and Electronics Engineers, Inc. "Draft Standard for Local and Metropolitan Area Networks—Timing and Synchronization for Time-Sensitive Applications" IEEE P802.1AS-Rev/D0.9, New York, USA, Feb. 2015, 338 Pages.

Samsung "qPTP Message QoS" 3GPP TSG-SA WG2 Meeting #134, Sapporo, Japan, Jun. 2019, S2-1907697, 7 Pages.

Nokia "Vertical_LAN TSN related CR for non-FASMO corrections" SA WG2 Meeting #137E, Elbonia, Feb. 2020, S2-2002212, 23 Pages.

First Office Action for Indian Application No. 202317006141, dated Nov. 20, 2023, 6 Pages.

First Office Action for Chinese Application No. 202010726051.8 dated May 25, 2022, 12 Pages.

International Search Report and Written Opinion for Application No. PCT/CN2021/108165, dated Oct. 26, 2021, 8 Pages.

3GPP Organizational Partners "3rd Generation Partnership Project: Technical Specification Group Services and System Aspects; Study on enhanced support of Industrial Internet of Things (IIoT) in the 5G System (5GS)" Sophia Antipolis Valbonne—France, 3GPP TR 23.700-20 V0.4.0, Jun. 2020, 56 Pages.

LAN/MAN Standards Committee of the IEEE Computer Society. Timing and Synchronization for Time-Sensitive Applications. IEEE P802.1AS-Rev/D8.0. Jan. 16, 2019. 147 pages.

First Singaporean Office Action for Singaporean Patent Application No. 11202300349P mailed Aug. 20, 2025. 12 pages.

* cited by examiner

INFORMATION CONTROL METHOD AND APPARATUS, AND COMMUNICATIONS DEVICE

CROSS-REFERENCE TO RELATED APPLICATIONS

This application is a continuation of International Application No. PCT/CN2021/108165 filed on Jul. 23, 2021, which claims priority to Chinese Patent Application No. 202010726051.8, filed on Jul. 24, 2020, which are incorporated herein by reference in their entireties.

TECHNICAL FIELD

Embodiments of this application relate to the field of communications technologies, and in particular, to an information control method and apparatus, and a communications device.

BACKGROUND

In a time-sensitive network (TSN), data can be forwarded between a sending end and a receiving end of a time-related data flow through one or more bridges. In a time synchronization network, a bridge may receive clock notification messages of different clocks from different ports, and the bridge itself also has a clock. The bridge needs to compare the received clock with a clock of a current system, select an optimal clock as a master clock, and then send a notification message to propagate the selected master clock. Therefore, how to determine an optimal clock is a problem to be urgently resolved for time-related services at present.

SUMMARY

Embodiments of this application provide an information control method and apparatus, and a communications device.

According to a first aspect, an embodiment of this application provides an information control method, applied to a first communications device and including:

receiving a first message, where the first message is a message including information about a first root object; and performing a first operation; where the first operation includes at least one of the following:

generating a message priority vector based on a first port and the first message;

discarding the first message; and performing a second-type operation of the first operation; where the second-type operation of the first operation includes at least one of the following:

generating a path priority vector of the first root object based on the first port, the first message, and/or a path cost of a receiving port, or generating a path priority vector of the first root object based on the message priority vector and/or a path cost of a receiving port;

sending first root information to a first target end; and replacing a port priority vector of the first port with the message priority vector; where the first port includes a port for receiving the first message; and the first root information includes at least one of the following: the first message, the message priority vector, the port priority vector of the first port, the path priority vector of the first root object, information about the first port, and the path cost of the receiving port.

According to a second aspect, an embodiment of this application provides an information control method, applied to a second communications device and including:

receiving first root information; and performing a second operation based on the first root information; where the second operation includes at least one of the following:

generating a message priority vector based on a first message and/or a first port;

generating a path priority vector of a first root object based on the first port, the first message, and/or a path cost of a receiving port, or generating the path priority vector of the first root object based on a message priority vector and/or the path cost of the receiving port, or generating the path priority vector of the first root object based on a port priority vector of the first port and/or the path cost of the receiving port; and performing a second-type operation of the second operation; where the second-type operation of the second operation includes at least one of the following:

determining an optimal root object;

determining second root information; and sending the second root information to a second target end; where the first root information includes at least one of the following: the first message, the message priority vector, the port priority vector of the first port, the path priority vector of the first root object, information about the first port, and the path cost of the receiving port;

the first message is a message including information about the first root object;

the first port includes a port for receiving the first message;

the second root information includes at least one of the following: a second message, a second priority vector, information about a second port, and configuration information of a port status;

the second message is a message including information about the optimal root object;

the second port includes at least one of the following: a port for sending the second message, a port for sending the second priority vector, a port for sending the second root information, and a port whose port status is a master port, a designated port, or a sending port; and the second priority vector is a priority vector that includes the information about the optimal root object.

According to a third aspect, an embodiment of this application provides an information control method, applied to a third communications device and including:

obtaining second root information, where the second root information includes at least one of the following: a second message or a second priority vector, information about a second port, and configuration information of a port status; and performing a third operation based on the second root information; where the third operation includes at least one of the following:

adding egress port information to the obtained second message;

generating a second message;

sending the second message to a target port;

generating a second priority vector; and replacing a port priority vector of the target port with a second priority vector, where the second priority vector is the generated second priority vector or the obtained second priority vector; where the second port includes at least one of the following: a port for sending the second message, a port for sending the second priority vector, a port for sending the second root information, and a port whose port status is a master port, a designated port, or a sending port; and the second message is a message including information about an optimal root object.

According to a fourth aspect, an embodiment of this application provides an information control method, applied to a fourth communications device and including:

receiving first root information; and performing a fourth operation based on the first root information; where the fourth operation includes at least one of the following:

sending the first root information through a first data channel;

sending the first root information other than information about a first port through the first data channel; and sending one of the following through the first data channel: a first message, a message priority vector, a port priority vector of the first port, a path priority vector of a first root object, a first message and/or a path cost of a receiving port, a message priority vector and the path cost of the receiving port, the port priority vector of the first port and the path cost of the receiving port, and the path priority vector of the first root object and the path cost of the receiving port; where the first root information includes at least one of the following: the first message, the message priority vector, the port priority vector of the first port, the path priority vector of the first root object, the information about the first port, and the path cost of the receiving port;

the first data channel is a data channel associated with the first port, or a data channel associated with any DS-TT port;

the first port includes a port for receiving the first message; and the first message is a message including information about the first root object.

According to a fifth aspect, an embodiment of this application provides an information control method, applied to a fifth communications device and including:

receiving second root information; and performing a fifth operation based on the second root information; where the fifth operation includes at least one of the following:

sending the second root information through a second data channel;

sending the second root information other than information about a second port through the second data channel; and sending one of the following through the second data channel: a second message, a second priority vector, the second message and configuration information of a port status, and the second priority vector and the configuration information of the port status; where the second root information includes at least one of the following: the second message or the second priority vector, the information about the second port, and the configuration information of the port status;

the second port includes at least one of the following: a port for sending the second message, a port for sending the second priority vector, a port for sending the second root information, and a port whose port status is a master port, a designated port, or a sending port;

the second data channel is a data channel associated with the second port, or a data channel associated with any DS-TT port; and the second message is a message including information about an optimal root object.

According to a sixth aspect, an embodiment of this application provides an information control method, applied to a sixth communications device and including:

receiving a first container or a second container, where the first container includes first root information, the first root information includes at least one of the following: a first message, a message priority vector, a port priority vector of a first port, a path priority vector of a first root object, information about the first port, and a path cost of the receiving port, the second container includes second root information, and the second root information includes at least one of the following: a second message or a second priority vector, information about a second port, and configuration information of a port status; and performing a sixth operation based on the first root information and/or the second root information; where the sixth operation includes at least one of the following:

adding the first root information to the second container for sending; and adding the second root information to the first container for sending; where the first container includes one of the following: a port management information container and a DS-TT management information container;

the second container includes one of the following: an NW-TT management information container and a bridge management information container; and the configuration information of the port status is used for configuring a status of a port.

According to a seventh aspect, an embodiment of this application provides an information control method, applied to a seventh communications device and including:

receiving second root information from a second data channel; and performing a seventh operation based on the second root information; where the seventh operation includes at least one of the following:

determining information about a second port based on information about a DS-TT port associated with the second data channel; and sending the second root information and/or the information about the second port to a DS-TT; where the second data channel is a data channel associated with the second port, or a data channel associated with any DS-TT port;

the second root information includes at least one of the following: a second message, a second priority vector, the information about the second port, and configuration information of a port status; and the second port includes at least one of the following: a port for sending the second message, a port for sending the second priority vector, a port for sending the second root information, and a port whose port status is a master port, a designated port, or a sending port.

According to an eighth aspect, an embodiment of this application provides an information control apparatus, applied to a first communications device and including:

a first receiving module, configured to receive a first message, where the first message is a message including information about a first root object; and a first execution module, configured to perform a first operation; where the first operation includes at least one of the following:

generating a message priority vector based on a first port and the first message;

discarding the first message; and performing a second-type operation of the first operation; where the second-type operation of the first operation includes at least one of the following:

generating a path priority vector of the first root object based on the first port, the first message, and/or a path cost of a receiving port, or generating a path priority vector of the first root object based on the message priority vector and/or a path cost of a receiving port;

sending first root information to a first target end; and replacing a port priority vector of the first port with the message priority vector; where the first port includes a port for receiving the first message; and the first root information includes at least one of the following: the first message, the message priority vector, the port priority vector of the first port, the path priority vector of the first root object, information about the first port, and the path cost of the receiving port.

According to a ninth aspect, an embodiment of this application provides an information control apparatus, applied to a second communications device and including:

a second receiving module, configured to receive first root information; and a second execution module, configured to perform a second operation based on the first root information; where the second operation includes at least one of the following:

generating a message priority vector based on a first message and/or a first port;

generating a path priority vector of a first root object based on the first port, the first message, and/or a path cost of a receiving port, or generating the path priority vector of the first root object based on a message priority vector and/or the path cost of the receiving port, or generating the path priority vector of the first root object based on a port priority vector of the first port and/or the path cost of the receiving port; and performing a second-type operation of the second operation; where the second-type operation of the second operation includes at least one of the following:

determining an optimal root object;

determining second root information; and sending the second root information to a second target end; where the first root information includes at least one of the following: the first message, the message priority vector, the port priority vector of the first port, the path priority vector of the first root object, information about the first port, and the path cost of the receiving port;

the first message is a message including information about the first root object;

the first port includes a port for receiving the first message;

the second root information includes at least one of the following: a second message, a second priority vector, information about a second port, and configuration information of a port status;

the second message is a message including information about the optimal root object;

the second port includes at least one of the following: a port for sending the second message, a port for sending the second priority vector, a port for sending the second root information, and a port whose port status is a master port, a designated port, or a sending port; and the second priority vector is a priority vector that includes the information about the optimal root object.

According to a tenth aspect, an embodiment of this application provides an information control apparatus, applied to a third communications device and including:

an obtaining module, configured to obtain second root information, where the second root information includes at least one of the following: a second message or a second priority vector, information about a second port, and configuration information of a port status; and a third execution module, configured to perform a third operation based on the second root information; where the third operation includes at least one of the following:

adding egress port information to the obtained second message;

generating a second message;

sending the second message to a target port;

generating a second priority vector; and replacing a port priority vector of the target port with a second priority vector, where the second priority vector is the generated second priority vector or the obtained second priority vector; where the second port includes at least one of the following: a port for sending the second message, a port for sending the second priority vector, a port for sending the second root information, and a port whose port status is a master port, a designated port, or a sending port; and the second message is a message including information about an optimal root object.

According to an eleventh aspect, an embodiment of this application provides an information control apparatus, applied to a fourth communications device and including:

a third receiving module, configured to receive first root information; and a fourth execution module, configured to perform a fourth operation based on the first root information; where the fourth operation includes at least one of the following:

sending the first root information through a first data channel;

sending the first root information other than information about a first port through the first data channel; and sending one of the following through the first data channel: a first message, a message priority vector, a port priority vector of the first port, a path priority vector of a first root object, a first message and/or a path cost of a receiving port, a message priority vector and the path cost of the receiving port, the port priority vector of the first port and the path cost of the receiving port, and the path priority vector of the first root object and the path cost of the receiving port; where the first root information includes at least one of the following: the first message, the message priority vector, the port priority vector of the first port, the path priority vector of the first root object, the information about the first port, and the path cost of the receiving port;

the first data channel is a data channel associated with the first port, or a data channel associated with any DS-TT port;

the first port includes a port for receiving the first message; and the first message is a message including information about the first root object.

According to a twelfth aspect, an embodiment of this application provides an information control apparatus, applied to a fifth communications device and including:

a fourth receiving module, configured to receive second root information; and a fifth execution module, configured to perform a fifth operation based on the second root information; where the performing a fifth operation includes at least one of the following:

sending the second root information through a second data channel;

sending the second root information other than information about a second port through the second data channel; and sending one of the following through the second data channel: a second message, a second priority vector, the second message and configuration information of a port status, and the second priority vector and the configuration information of the port status; where the second root information includes at least one of the following: the second message or the second priority vector, the information about the second port, and the configuration information of the port status;

the second port includes at least one of the following: a port for sending the second message, a port for sending the second priority vector, a port for sending the second root information, and a port whose port status is a master port, a designated port, or a sending port;

the second data channel is a data channel associated with the second port, or a data channel associated with any DS-TT port; and the second message is a message including information about an optimal root object.

According to a thirteenth aspect, an embodiment of this application provides an information control apparatus, applied to a sixth communications device and including:

a fifth receiving module, configured to receive a first container or a second container, where the first container includes first root information, the first root information includes at least one of the following: a first message, a message priority vector, a port priority vector of a first port, a path priority vector of a first root object, information about the first port, and a path cost of the receiving port, the second container includes second root information, and the second root information includes at least one of the following: a second message or a second priority vector, information about a second port, and configuration information of a port status; and a sixth execution module, configured to perform a sixth operation based on the first root information and/or the second root information; where the sixth operation includes at least one of the following:

adding the first root information to the second container for sending; and adding the second root information to the first container for sending; where the first container includes one of the following: a port management information container and a DS-TT management information container;

the second container includes one of the following: an NW-TT management information container and a bridge management information container; and the configuration information of the port status is used for configuring a status of a port.

According to a fourteenth aspect, an embodiment of this application provides an information control apparatus, applied to a seventh communications device and including:

a sixth receiving module, configured to receive second root information from a second data channel; and a seventh execution module, configured to perform a seventh operation based on the second root information; where the seventh operation includes at least one of the following:

determining information about a second port based on information about a DS-TT port associated with the second data channel; and sending the second root information and/or the information about the second port to a DS-TT; where the second data channel is a data channel associated with the second port, or a data channel associated with any DS-TT port;

the second root information includes at least one of the following: a second message, a second priority vector, the information about the second port, and configuration information of a port status; and the second port includes at least one of the following: a port for sending the second message, a port for sending the second priority vector, a port for sending the second root information, and a port whose port status is a master port, a designated port, or a sending port.

According to a fifteenth aspect, an embodiment of this application provides a communications device, including a processor, a memory, and a computer program stored on the memory and capable of running on the processor. When the computer program is executed by the processor, the steps of the information control method according to the first aspect are implemented, or the steps of the information control method according to the second aspect are implemented, or the steps of the information control method according to the third aspect are implemented, or the steps of the information control method according to the fourth aspect are implemented, or the steps of the information control method according to the fifth aspect are implemented, or the steps of the information control method according to the sixth aspect are implemented, or the steps of the information control method according to the seventh aspect are implemented.

According to a sixteenth aspect, an embodiment of this application provides a computer-readable storage medium, where a computer program is stored in the computer-readable storage medium. When the computer program is executed by a processor, the steps of the information control method according to the first aspect are implemented, or the steps of the information control method according to the second aspect are implemented, or the steps of the information control method according to the third aspect are implemented, or the steps of the information control method according to the fourth aspect are implemented, or the steps of the information control method according to the fifth aspect are implemented, or the steps of the information control method according to the sixth aspect are implemented, or the steps of the information control method according to the seventh aspect are implemented.

According to the embodiments, selection and obtaining of the optimal root object clock (for example, the optimal master clock or the optimal root bridge) under a distributed TT structure of the 5G bridge can be supported.

BRIEF DESCRIPTION OF DRAWINGS

Other advantages and benefits will become apparent to those of ordinary skill in the art by reading detailed description of the exemplary embodiments below. The accompanying drawings are merely intended to illustrate the purposes of the preferred implementations, and should not be construed as a limitation on this application. Throughout the accompanying drawings, the same reference numerals represent the same components. In the accompanying drawings.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects is not limited, for example, a first object may be one or multiple. In addition, "and/or" in this specification and claims indicates at least one of connected objects, and the symbol "/" generally indicates that the associated objects are in an "and/or" relationship. For example, an NW-TT/UPF may be a co-located device.

It should be noted that technologies described in the embodiments of this application are not limited to a long term evolution (LTE)/LTE-advanced LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the afore-mentioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
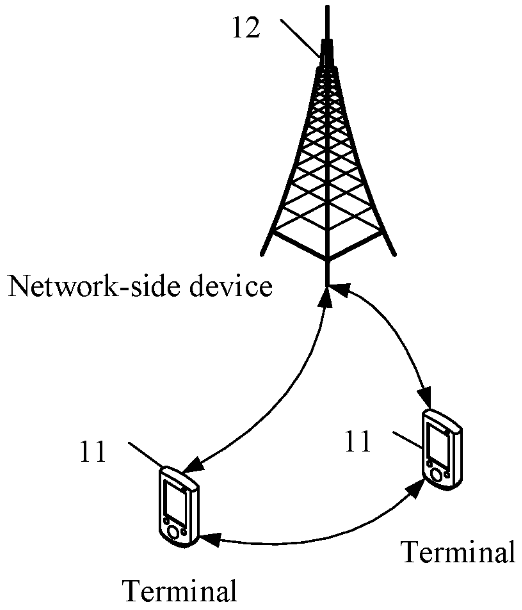
FIG. 1 is a schematic architectural diagram of a wireless communications system according to an embodiment of this application.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

In the embodiments of this application, time-sensitive may also be referred to as periodic deterministic. Time-sensitive communication may also be referred to as periodic deterministic communication. A time-sensitive data stream may also be referred to as a periodic deterministic data stream. An example of a time-sensitive networking technology is an IEEE TSN (Time Sensitive Network). In periodic deterministic communication, data is transmitted periodically at transfer intervals.

In this embodiment of this application, a sending end of a time-sensitive data stream is referred to as a talker, and a receiving end of the time-sensitive data stream is referred to as a listener. Data may be forwarded through one or more bridges between the talker and the listener. An end station may be a talker or a listener. The bridge is responsible for data transmission between the talker and the listener.

A terminal (for example, User Equipment, UE), a time-sensitive translator, and a communications network constitute a bridge (subsequently using a 5G bridge as an example). For downlink data, a port of the device-side time-sensitive network translator (DS-TT) may be an egress port of data, and a port of the network-side time-sensitive network translator (NW-TT) is an ingress port of data. For uplink data, a port of the NW-TT may be an egress port of data, and a port of the DS-TT is an ingress port of data. The terminal and the DS-TT may be co-located. A user-plane function (UPF) and the NW-TT may be co-located.

Optionally, one terminal may be connected to one or more DS-TTs, and one DS-TT may have one or more ports. One 5G bridge may have one UPF, and one or more ports may be enabled on the NW-TT of the UPF. The terminal may act as a port proxy of the DS-TT, to establish a protocol data unit (PDU) session with the UPF. An association is established, through the PDU session, between the port on the DS-TT and the port on the NW-TT that is co-located with the UPF. The port on the DS-TT serves as a port of the 5G bridge. The port of the DS-TT and the port of the NW-TT each may be connected to a TSN bridge and/or an end station. With the 5G bridge, TSN bridges and/or end stations connected to the ports of the TTs may communicate with each other.

A time-sensitive system imposes high requirements for time synchronization, and requires all clocks to be synchronized. However, a plurality of master clocks may be present in the network. In order to determine an optimal clock in the 5G bridge, the following problems still need to be resolved:

Problem 1: In the 5GS bridge, bridge ports are located on the DS-TT and the NW-TT, and one 5G network may have a plurality of DS-TTs. Therefore, different DS-TTs and the NW-TT may all receive notification messages of external clocks, and a centralized node is required to determine an optimal clock for this bridge.

An optional solution is to use NW-TT as a central node. After receiving a notification message, a DS-TT forwards the notification message to the NW-TT, and the NW-TT determines a master clock and a next-hop clock notification message based on clock information collected from the DS-TT ports and NW-TT ports.

For example, when a clock of the current system is used as a master clock, a root clock in the next-hop clock notification message is the clock of the current system, with a distance from the root clock being 0.

For example, when a clock in one of the received clock notification messages is used as a master clock, a root clock in the next-hop clock notification message is the received clock, a path cost of the root clock (for example, a distance hop count from the root clock) is incremented by 1, and then a port for sending the clock notification message is determined.

Problem 2: According to an optimal clock selection algorithm, after a port receives a clock notification message, a message priority vector is derived, and the message priority vector is compared with a port priority vector. If the message priority vector is not superior to the port priority vector, it is meaningless for the DS-TT to forward the clock notification message or message priority vector to the NW-TT due to impossibility of being a candidate for the optimal clock. Sending the clock notification message or message priority vector leads to a waste of resources.

An optional solution is to configure storing port priority vectors of all ports on the DS-TT. After comparing the port priority vector with a message priority vector derived from a received notification message, the DS-TT sends the notification message or the message priority vector to the NW-TT only in a case that the message priority vector is superior to the port priority vector; otherwise, the DS-TT discards the received notification message or the message priority vector.

Problem 3: A receiving port is one of inputs of the optimal clock selection algorithm. How does the NW-TT know a receiving port of a notification message when there is no receiving port information in the notification message?

In a case that the DS-TT sends a notification message, because there is no receiving port identification information in the notification message, the DS-TT needs to make the UE send the notification message through a PDU session for a port receiving the notification message, so that the UPF associates a port index through the PDU session and the NW-TT derives a message priority vector based on the receiving port index and the notification message to proceed with the next step.

In a case that the DS-TT sends a message priority vector, the message priority vector is included in a related port management container of the receiving port or a DS-TT management container for sending, and the message priority vector includes a message of the receiving port.

In an implementation, in a case that the message priority vector is superior to the port priority vector, the DS-TT updates the port priority vector to the message priority vector, and sends the updated port priority vector to the NW-TT.

In addition, in the network, there may also be a plurality of root bridges, and how to determine a root bridge in 5G bridges and generate paths according to a spanning tree algorithm also needs to be resolved. A problem and method for determining an optimal root bridge are similar to those for determining the master clock.

Problem 1: In the 5GS bridge, bridge ports are located on the DS-TT and the NW-TT, and one 5G network may have a plurality of DS-TTs. Therefore, different DS-TTs and the NW-TT may all receive configuration messages of external root bridges, and a centralized node is required to determine an optimal root bridge for this bridge.

Problem 2: According to a spanning tree algorithm, after a port receives a configuration message, a message priority vector is derived, and the message priority vector is compared with a port priority vector. If the message priority vector is not superior to the port priority vector, it is meaningless for the DS-TT to forward the clock notification message or message priority vector to the NW-TT due to impossibility of being a candidate for the optimal root bridge. Sending the configuration message or message priority vector leads to a waste of resources.

Problem 3: A receive port is one of inputs of the spanning tree algorithm, and how does the NW-TT know a receiving port of a configuration message when there is no receiving port information in the notification message.

In the embodiments of this application, information about a root object and root object information represent the same meaning, and may be used interchangeably.

Optionally, the root object may include at least one of the following: a master clock and a root bridge.

In an implementation, the master clock may also be referred to as a root clock. In another implementation, the root bridge may be a bridge that provides the master clock.

Optionally, a first message includes one of the following: a first notification message and a first configuration message.

Optionally, a second message includes one of the following: a second notification message and a second configuration message.

In an implementation, the notification message includes but is not limited to one of the following: an announce message in the generalized precision time protocol (gPTP) or an announce message in the precision time protocol (PTP).

In an implementation, the configuration message includes but is not limited to one of the following: a configuration message in a bridge protocol data unit (BPDU) or a configuration message in the rapid spanning tree protocol (RSTP).

Optionally, a priority vector includes at least one of the following:

- information about a root object;
- a path cost of the root object (which may represent a path cost between the system and the root object);
- information about an egress port (which may indicate a port that sends a message);
- information about a receiving port (which may indicate a port that receives a message); and
- a bridge identifier of a transmitting bridge.

It is easy to understand that, for example, when a system B receives a first message from a system A, a transmitting bridge is the system A, an egress port is a port of the system A, and a receiving port is a port of the system B. For example, the system B is to send a second message to another system. In a priority vector of the system B, a transmitting bridge is the system B, an egress port is a port of the system B, and a receiving port is a port of the system B.

Further, the information about the root object includes but is not limited to one of the following: a root bridge identifier and a root system identifier.

Further, the path cost of the root object includes but is not limited to one of the following: Root Path Cost (a path cost from the transmitting bridge to the root bridge) and stepsRemoved (the number of links in a path between a time-aware system and the root system).

Optionally, a path cost of a first root object may be a path cost to the first root object. In an implementation, the path cost of the first root object includes but is not limited to one of the following: first stepsRemoved (representing the number of links in a path between a first root system and the time-aware system) or first Root Path Cost (which is a path cost from a transmitting bridge to a first root bridge).

Optionally, a path cost of an optimal root object may be a path cost to the optimal root object. In an implementation, the path cost of the optimal root object includes but is not limited to one of the following: second stepsRemoved (representing the number of links in a path between an optimal root system (which is an optimal master clock system) and a time-aware system) or second root path cost (path cost from a transmitting bridge to the optimal root bridge).

In an implementation, a priority vector may include at least one of the following information:

- root bridge identifier: a bridge identifier of a bridge believed to be the root by the transmitter (The Bridge Identifier of the Bridge believed to be the Root by the transmitter);
- root path cost (root path cost from a transmitting bridge to a root bridge, Root Path Cost to that Root Bridge from the transmitting Bridge);
- bridge identifier of the transmitting bridge (Bridge Identifier of the transmitting Bridge);
- information about an egress port (for example, a port identifier) that is a transmitting port of a message (Port Identifier of the Port through which the message was transmitted); and
- information about a receiving port that is a receiving port of a message (Port Identifier of the Port through which the message was received).

In another implementation, a priority vector includes at least one of the following information:

- root system identifier rootSystemIdentity;
- root path cost (stepsRemoved): the number of links in a path from a root system to a time-aware system (it is the number of links in the path from the root to the respective time-aware system);
- information about an egress port that is a port of a transmitting time-aware system that sends a message (sourcePortIdentity, that is, portIdentity of the transmitting time-aware system); and
- information about a receiving port portNumber of the receiving port.

In an implementation, a system priority vector may include a priority vector of a root object that is currently used in the current system. The system priority vector may also be referred to as a bridge priority vector, and the bridge priority vector may include a priority vector of a root object that is currently used in the current bridge.

In an implementation, the path priority vector is a priority vector related to a path from the root object. The path priority vector includes but is not limited to one of the following: a priority vector related to a path for a master clock (gmpath Priority Vector) and a priority vector related to a path from a root bridge (root path priority vector).

Optionally, a path priority vector of the first root object is a priority vector related to a path from the first root object. For example, when the system B receives a first message from the system A, during generation of a path cost between the system B and the first root object, a path cost between the system B and the first root object needs to be generated based on a path cost between the system A and the first root object and a path cost of a receiving port of the system B. A path cost to a root object included in the path priority vector of the system B is a path cost between the system B and the first root object.

Optionally, the path cost of the receiving port may be a path cost from the system A (for example, an egress port from which the system A sends the first message) to the system B (for example, a port from which the system B receives the first message). In an implementation, for example, in the optimal clock algorithm, the path cost of the receiving port is 1 hop. The path priority vector may be generated by adding 1 to the path cost to the root object in the message priority vector, or by adding 1 to the path cost to the root object in the port priority vector of the first port obtained through replacement.

A second priority vector includes but is not limited to one of the following: a designated priority vector and a master priority vector. The second priority vector is an externally sent priority vector.

In an implementation, the first message is a first message received from the DS-TT port and/or the NW-TT port. In another implementation, the first message is a first message received from a data channel.

In an optional embodiment of this application, information about a port includes an identifier of the port, such as a port index, a MAC address of the port, and/or an IP address of the port.

In this embodiment, a port state may include one of the following: master port state (MasterPort), designated port state or sending port state, slave port state (Slave) or receiving port state, passive port state, and unavailable port state.

A port in the master port state, the designated port state, or the sending port state may be a port for sending a related message (examples of the related message are an announce message and a configuration message). The related message includes information about a root object. The port in the master port state, the designated port state, or the sending port state is a port closest to the root object in the system.

A port in the slave port state or the receiving port state may be a port that is not used for receiving a related message (examples of the related message are an announce message, a configuration message, and a Sync message). The related message includes the information about the root object.

A port in the passive port state may be a port other than the following ports. The following ports include ports in the following states: master port state (MasterPort), designated port state or sending port state, slave port state (Slave) or receiving port state, and unavailable port state.

In an optional embodiment of this application, the system includes a bridge. For example, the system A may include a bridge A, and the system B may include a bridge B.

In the embodiments of this application, optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of this application. For example, when specific capability indication information transmitted by a device is not received, it can be deduced that the device does not support the capability.

Optionally, transmitting may include broadcasting, broadcasting through a system message, or returning a response after receiving the request.

Optionally, being preconfigured may be referred to as being a default.

In an optional embodiment of this application, a port management container may also be referred to as a port management information container. The port management container is a container that carries port control information (also referred to as port management information).

In an embodiment of this application, the port may be one of the following: an Ethernet port and an IP port.

In an embodiment of this application, a data channel may include but is not limited to one of the following: a PDU session, a PDN connection, a QoS flow, a bearer, and an Internet Protocol Security (IPsec) channel, where the bearer may be an evolved radio access bearer (E-RAB), a radio access bearer (RAB), a data radio bearer (DRB), a signaling radio bearer (SRB), and the like. In an optional embodiment of this application, a TT port, a port of a TT, a port on the TT, a port on the TT side, and a TT-side port have the same meaning and may be used interchangeably.

In an optional embodiment of this application, a DS-TT port and a port of the DS-TT are both ports located on the DS-TT, and may be used interchangeably. In an optional embodiment of this application, an NW-TT port and the port of the NW-TT are both ports located on the NW-TT, and may be used interchangeably.

In an optional embodiment of this application, the DS-TT port may alternatively be equivalent to a device-side port; and the NW-TT port may also be equivalent to a network-side port. A TT type of the port being DS-TT may be equivalent to the port being a device-side port; and a TT type of the port being NW-TT may be equivalent to the port being a network-side port.

In an optional embodiment of this application, a communications device may include at least one of the following: a communications network element and a terminal.

In an embodiment of this application, the communications network element may include at least one of the following: a core network network element and a radio access network network element.

In the embodiments of this application, a core-network network element (CN network element) may include but is not limited to at least one of the following: a core network device, a core network node, a core network function, a core-network network element, a mobility management entity (MME), an access mobility management function (AMF), a session management function (SMF), a user plane function (UPF), a serving gateway (serving GW, SGW), a PDN gateway, a policy control function (PCF), a policy and charging rules function unit (Policy and Charging Rules Function, PCRF), a GPRS serving support node (SGSN), a gateway GPRS support node (GGSN), a unified data management (UDM), a unified data repository (UDR), a home subscriber server (HSS), an application function (AF), and a centralized network configuration (CNC).

In the embodiments of this application, a radio access network (RAN) network element may include but is not limited to at least one of the following: a radio access network device, a radio access network node, a radio access network function, a radio access network unit, a Third Generation Partnership Project (3GPP) radio access network, a non-3GPP radio access network, a centralized unit (CU), a distributed unit (DU), a base station, an evolved Node B (eNB), a 5G base station (gNB), a radio network controller (RNC), a base station (NodeB), a non-3GPP interworking function (Non-3GPP Inter Working Function, N3IWF), an access controller (AC) node, an access point (AP) device, a wireless local area network (WLAN) node, or an N3IWF.

The method and the communications device provided in the embodiments of this application may be applied to a wireless communications system. The wireless communications system may be a fifth-generation (5G) mobile communications system, or an evolved packet system (EPS), or a later evolved communications system. The wireless communications system in the embodiments of this application may be a fifth generation mobile communications network (5GS) or an LTE network.

The following describes the information control method in the embodiments of this application.

Figure 2:
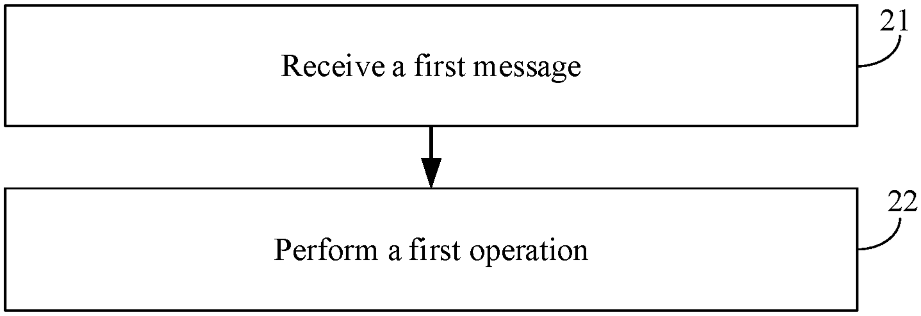
FIG. 2 is a schematic flowchart of an information control method according to an embodiment of this application.

Referring to FIG. 2, an embodiment of this application provides an information control method, applied to a first communications device. The first communications device includes but is not limited to at least one of the following: a DS-TT, an NW-TT, and/or a UPF. The method includes the following steps.

Step 21: Receive a first message.

In this embodiment, the first message is a message including information about a first root object. The first root object may include at least one of the following: a first master clock and a first root bridge.

Optionally, the information about the first root object includes but is not limited to one of the following: a first root bridge identifier) and a first root system identifier (root SystemIdentity).

Further, the first root bridge may be a bridge that provides the first master clock.

Optionally, the first root information may include at least one of the following: the first message, a message priority vector, a port priority vector of a first port, a path priority vector of the first root object, information about the first port, and a path cost of a receiving port.

In an implementation, the first message is a first message received from a DS-TT port and/or an NW-TT port. In another implementation, the first message is a first message received from a data channel.

In an implementation, the first root information includes but is not limited to one of the following: the first message, the message priority vector, the port priority vector of the first port, and the path priority vector of the first root object. It is easy to understand that when the first root information includes the first message, it means that the first communications device sends the first message without processing; and when the first root information includes the message priority vector, the port priority vector of the first port, and the path priority vector of the first root object, it means that the first communications device processes and then sends the first message.

In an implementation, the port priority vector of the first port may be a port priority vector obtained through replacement, and has a same value as the message priority vector.

The first port includes a port for receiving the first message.

Optionally, the path cost of the receiving port may be a path cost from a system A (for example, an egress port from which the system A sends the first message) to a system B (for example, a port from which the system B receives the first message). The system A is a system that sends the first message. The system B is a system to which the first communications device belongs.

In an implementation, for example, in an optimal clock algorithm, the path cost of the receiving port is 1 hop. The path priority vector may be generated by adding 1 to the path cost to the root object in the message priority vector, or by adding 1 to the path cost to the root object in the port priority vector of the first port obtained through replacement.

Further, information in the first message may include at least one of the following: the information about the first root object, a path cost to the first root object, identification information of a sending port of the first message, and information about the egress port. Specifically, the egress port is a port that sends the first message.

Further, the message priority vector includes at least one of the following: the information about the first root object, a path cost of the first root object, the information about the egress port, information about the receiving port, and a bridge identifier of a transmitting bridge.

Optionally, the path cost of the first root object may be a path cost to the first root object.

Step 22: Perform a first operation.

Optionally, the first operation may include at least one of the following:

generating a message priority vector based on a first message and/or a first port;

discarding the first message; and performing a second-type operation of the first operation.

Optionally, the message priority vector may include at least one of the following: the information in the first message, port identification information of the first port, the information about the first root object, the path cost of the first root object, the information about the egress port, the information about the receiving port, and the bridge identifier of the transmitting bridge. Specifically, the egress port is a port that sends the first message. The receiving port is a port that receives the first message.

Optionally, the path cost of the first root object may be a path cost to the first root object.

When the first communications device is a DS-TT, the first port may include a port on the first communications device.

When the first communications device is an NW-TT, the first port may include a port on the NW-TT and/or a port on the DS-TT. When the first port is a port on the DS-TT, the first communications device may obtain the information about the first port based on a port associated with a data channel that receives the first message. For example, the NW-TT may obtain the information about the first port from a UPF; and the UPF may obtain the information about the first port based on the port associated with the data channel that receives the first message.

Further, the second-type operation of the first operation may include at least one of the following:

generating a path priority vector of the first root object based on the first port, the first message, and/or a path cost of a receiving port, or generating a path priority vector of the first root object based on the message priority vector and/or a path cost of a receiving port;

sending first root information to a first target end; and replacing a port priority vector of the first port with the message priority vector.

Optionally, the first port includes a port for receiving the first message.

In an implementation, the first port is a port on the DS-TT.

In another implementation, the first port is a port on the NW-TT.

Optionally, the first target end may include but is not limited to at least one of the following: a terminal, a UPF, an NW-TT, and an AF.

Optionally, the first message may include a notification message (for example, an announce message in the gPTP protocol) and/or a configuration message (for example, a configuration message in the spanning tree protocol).

In this embodiment, a port status may include one of the following: a master port state (Master), a designated port state, or a sending port state; and a slave port state (Slave) or a receiving port state, a passive port state, and an unavailable port state.

Information about the port status may include all status information of ports on the DS-TT and/or NW-TT in a bridge.

In this embodiment of this application, the second-type operation of the first operation may be performed in a case that a first condition is satisfied. The first condition includes that the message priority vector is superior to or equal to the port priority vector of the first port.

Optionally, the performing a first operation may include: discarding the first information in a case that a second condition is satisfied. The second condition includes that the port priority vector of the first port is superior to or equal to the message priority vector.

Further, the method further includes: in a case that the second condition is satisfied, skipping performing the second-type operation of the first operation. The second condition includes that the port priority vector of the first port is superior to or equal to the message priority vector.

In this embodiment of this application, the first root information may be included in the first container for sending. Optionally, the first container may include one of the following: a port management information container of the first port and a management information container of the DS-TT.

In an implementation, when the first root information is sent by using the first container, the first target end may be an AF. In this case, the first root information may include at least one of the following: the message priority vector, the port priority vector of the first port, the path priority vector of the first root object, the information about the first port, and the path cost of the receiving port.

Figure 4:
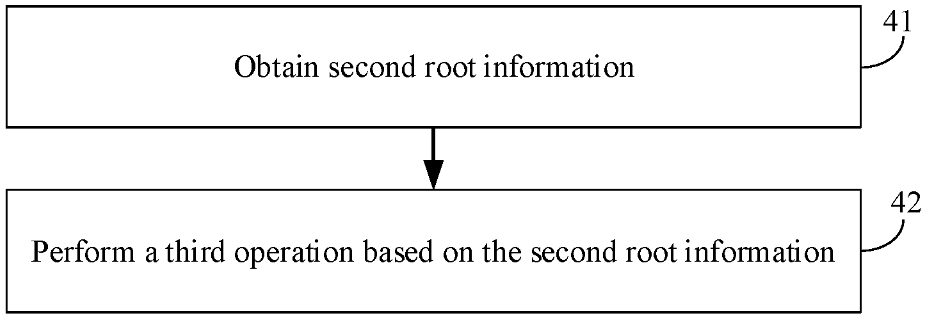
FIG. 4 is a schematic flowchart of another information control method according to an embodiment of this application.

Further, after receiving the first root information from the first container, the AF may include all or part of the first root information in the second container for sending, as specifically described in the embodiment of FIG. 4.

In this embodiment of this application, the first root information may be sent to the first target end through a first data channel. Optionally, the first data channel is a data channel associated with the first port, or a data channel associated with any DS-TT port.

In an implementation, when the first root information is sent through the first data channel, the first target end may be a UPF and/or an NW-TT, and the first root information may include the first message.

Further, the sending the first root information to the first target end through the first data channel may include: the terminal sends the first root information to the first target end through the first data channel.

It should be noted that the first communications device such as the DS-TT may alternatively obtain second root information, and perform a third operation based on the second root information. For a detailed process, reference may be made to the description in the embodiment shown in FIG. 4, and details are not repeated herein.

It is easy to understand that in this embodiment, the NW-TT may be used as a central node, and a DS-TT port receives the first message (for example, a notification message related to the master clock or a configuration message related to the root bridge) and sends the first message to the NW-TT. Based on a root object of the current system and root object information that is collected from DS-TT ports and NW-TT ports, the NW-TT determines an optimal root object (for example, a master clock or a root bridge) and a second message (for example, a notification message related to the master clock or a configuration message related to the root bridge) to be sent at a next hop. Further, the DS-TT port may generate and send a message priority vector to the AF, and the AF forwards the message priority vector to the NW-TT; or the DS-TT sends a first message to UE, and the UE sends the first message to the UPF/NW-TT through a PDU session. The UE may select a PDU session of the receiving port for sending, so that the NW-TT generates a message priority vector or a path priority vector. A next-hop message, that is, a second message, may be directly generated by the NW-TT; or the NW-TT generates and sends a second priority vector (for example, a master priority vector or a designated priority vector) to the target port, and the target port compares a port priority vector with the second priority vector and then generates a second message. In this way, selection and obtaining of the optimal root object clock under a distributed TT structure of the 5G bridge can be supported.

Figure 3:
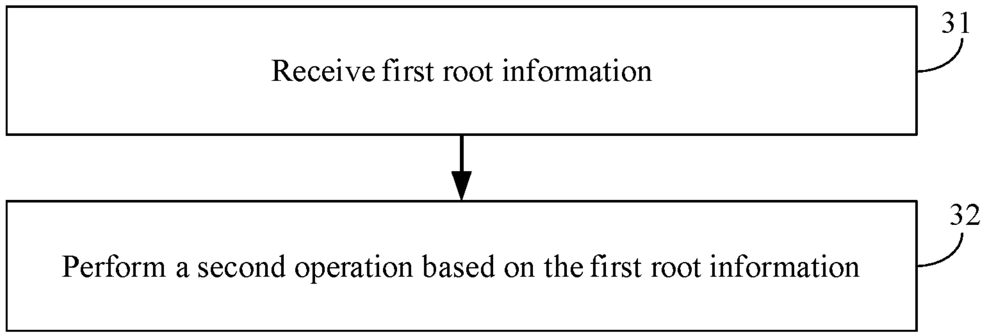
FIG. 3 is a schematic flowchart of another information control method according to an embodiment of this application.

Referring to FIG. 3, an embodiment of this application provides an information control method, applied to a second communications device. The second communications device includes but is not limited to: an NW-TT. In another implementation, the second communications device may alternatively be one of the following: a DS-TT and an AF. The method includes the following steps.

Step 31: Receive first root information.

In this embodiment, the first root information may include at least one of the following: a first message, a message priority vector, a port priority vector of a first port, a path priority vector of a first root object, information about the first port, and a path cost of a receiving port. For details, refer to the embodiment in FIG. 2. Details are not repeated herein. The first root object may include at least one of the following: a first master clock and a first root bridge.

Further, the first root bridge may be a bridge that provides the first master clock.

Optionally, the first message is a message including information about the first root object.

The first port includes a port for receiving the first message.

Step 32: Perform a second operation based on the first root information.

Optionally, the second operation may include at least one of the following:

generating a message priority vector based on a first message and/or a first port;

generating a path priority vector of a first root object based on the first port, the first message, and/or a path cost of a receiving port, or generating the path priority vector (it is easy to understand that the message priority vector may be received or generated) of the first root object based on a message priority vector and/or the path cost of the receiving port, or generating the path priority vector of the first root object based on a port priority vector of the first port and/or the path cost of the receiving port (it is easy to understand that the receiving port herein is the first port); and performing a second-type operation of the second operation.

Further, the second-type operation of the second operation may include at least one of the following:

determining an optimal root object, where, for example, the optimal root object may be an optimal master clock or an optimal root bridge;

determining second root information; and sending the second root information to a second target end.

Optionally, the second target end may include but not limited to at least one of the following: a terminal, a UPF, a DS-TT, and an AF.

Optionally, the second root information may include at least one of the following: a second message, a second priority vector, information about a second port, and configuration information of a port status.

Optionally, the second message is a message including information about the optimal root object. For example, the optimal root object is an optimal master clock or an optimal root bridge.

Optionally, the second port may include at least one of the following: a port for sending the second message, a port for sending the second priority vector, a port for sending the second root information, and a port whose port status is a master port, a designated port, or a sending port. The master port is a port for sending the second message.

In an implementation, the second communications device may designate a port whose port status is a master port, a designated port or a sending port as the second port.

Optionally, the second priority vector is a priority vector that includes the information about the optimal root object.

In an implementation, the operation of determining the optimal root object may include: when the path priority vector of the first root object is superior to or equal to a system priority vector and/or the message priority vector is superior to or equal to the port priority vector of the first port, the first root object is used as the optimal root object. When path priority vectors of a plurality of first root objects are superior to or equal to the system priority vector, an optimal one may be selected from the plurality of path priority vectors.

Optionally, the path priority vector of the first root object is a priority vector corresponding to a path between the system or bridge and the first root object, for example, a priority vector corresponding to a path between the system B and the first root object, where the system B is a system to which the second communications device belongs.

Optionally, the system priority vector may be a priority vector of a system to which the second communications device belongs or a bridge to which the second communications device belongs.

Alternatively, when the system priority vector is superior to or equal to the path priority vector, a root object currently used in the current system or the current bridge (for example, the system (such as the system B) to which the second communications device belongs or the bridge to which the second communications device belongs) is used as the optimal root object.

It is easy to understand that the NW-TT may receive, from a DS-TT and an NW-TT, a plurality of first messages, a plurality of message priority vectors, port priority vectors of a plurality of first ports, or path priority vectors of a plurality of first root objects.

When there are a plurality of sending ports for the second message, in an implementation, the second communications device may generate a second message for each sending port, and each second message includes information about a corresponding egress port. Alternatively, the second message generated by the second communications device includes no information about the egress port, but the second message and information about a second port are sent. The information about the second port may be port identification information of a plurality of sending ports.

When there are a plurality of sending ports for the second message, in another implementation, the second communications device may generate a plurality of second priority vectors for each sending port Each of the second priority vectors includes information about a corresponding egress port. Alternatively, the second priority vector generated by the second communications device includes no information about the egress port, but the second priority vector and information about a second port are sent. The information about the second port may be port identification information of the plurality of sending ports.

In an implementation, the second communications device may designate a port whose port status is a master port, a designated port or a sending port as the second port.

Optionally, the information of the second message may include at least one of the following: information about an optimal root object, a path cost of the optimal root object, and information about an egress port.

Optionally, the second priority vector may include at least one of the following: information about an optimal root object, a path cost of the optimal root object, information about an egress port, information about a receiving port, and a bridge identifier of a transmitting bridge. An egress port and a receiving port in the second priority vector may be the same.

Optionally, a path cost of an optimal root object may be a path cost to the optimal root object.

Optionally, the second priority vector may be embodied as at least one of the following: a master priority vector, a designated priority vector, a priority vector that can be derived from the second message, and a priority vector from which the second message can be derived.

In an implementation, when both the egress port and the receiving port in the second priority vector are a port Q, the second priority vector may also be referred to as a second priority vector of the port Q.

In this embodiment of this application, the second communications device may perform a second-type operation of the second operation in a case that a first condition is satisfied, where the first condition includes at least one of the following: the path priority vector of the first root object is superior to or equal to a system priority vector, and the message priority vector is superior to or equal to the port priority vector of the first port; and/or in a case that a second condition is satisfied, the second communications device may perform an operation of determining the information about the second port, where the second condition includes: a second priority vector of the second port is superior to or equal to a port priority vector of the second port; and/or in a case that a third condition is satisfied, the second communications device may send the second root information to the second target end, where the third condition includes: the second port is a port on a DS-TT; and/or in a case that a second priority vector of a port is superior to or equal to a port priority vector of the port, the second communications device may set a state of the port to be a master port state, a designated port state, or a sending port state, where the port being set to a master port state, a designated port state, or a sending port state may be a second port.

In an implementation, a root object currently used in the current system may include a master clock currently used in the current system or the root bridge.

In an implementation, when the first condition is satisfied, the first root object may be used as the optimal root object of the current system. The first condition includes at least one of the following: the path priority vector of the first root object is superior to or equal to a system priority vector, and the message priority vector is superior to or equal to the port priority vector of the first port In this embodiment of this application, the second root information may be included in a second container for sending. The second container includes one of the following: an NW-TT management information container and a bridge management information container.

In the implementation of sending the second root information by using the second container, the second target end may be an AF, and the second root information may include the second priority vector. After the AF receives the second root information from the second container, the AF may include the second root information in the first container for sending, as specifically described in the embodiment of FIG. 4.

Optionally, the second root information may be sent to the second target end through a second data channel. The second data channel is a data channel associated with the second port, or a data channel associated with any DS-TT port. It is easy to understand that the second port in this case is a port of the DS-TT.

In the implementation of sending the second root information through the second data channel, the second target end may be a terminal and/or a DS-TT, and the second root information may include the second message.

Further, the second root information being sent to the second target end through the second data channel may include: the UPF chooses to send the second root information to the second target end through the second data channel.

According to this embodiment, selection and obtaining of the optimal root object clock (for example, the optimal master clock or the optimal root bridge) under a distributed TT structure of the 5G bridge can be supported.

Referring to FIG. 4, an embodiment of this application provides an information control method, applied to a third communications device. The third communications device includes but is not limited to one of the following: a DS-TT and an NW-TT. The method includes the following steps.

Step 41: Obtain second root information.

In this embodiment, the second root information may include at least one of the following: a second message or a second priority vector, information about a second port, and configuration information of a port status.

The second message is a message including information about an optimal root object. For example, the optimal root object is an optimal master clock or an optimal root bridge.

The second port may include at least one of the following: a port for sending the second message, a port for sending the second priority vector, a port for sending the second root information, and a port whose port status is a master port, a designated port, or a sending port.

Step 42: Perform a third operation based on the second root information.

Optionally, the third operation may include at least one of the following:

adding egress port information to the obtained second message;

generating a second message;

sending the second message to a target port;

generating a second priority vector; and replacing a port priority vector of the target port with a second priority vector, where the second priority vector is the generated second priority vector or the obtained second priority vector.

Optionally, in a case that the second root information includes the second priority vector, the operation of generating a second message may include at least one of the following:

generating the second message based on the second priority vector;

generating the second message based on the second priority vector and the configuration information of the port status;

generating the second message based on the second priority vector and a port status;

generating the second message based on the second priority vector and the information about the second port; and generating the second message based on the second priority vector, where an egress port of the second message satisfies a condition that the second priority vector is superior to or equal to a port priority vector of the egress port.

In an implementation, the second priority vector includes information about the egress port, and the second message may be generated directly based on the second priority vector.

In another implementation, the second priority vector includes no port information, the second message may be generated based on the second priority vector and the configuration information of the port status, and a port whose port status is a master port, a designated port, or a sending port is designated as an egress port for the second message.

In another implementation, the second priority vector includes no port information, the second message may be generated based on the second priority vector and a port status (for example, a current state of the port), and a port whose port status is a master port, a designated port, or a sending port is designated as an egress port for the second message.

In another implementation, the second priority vector includes no information about the egress port, and the second message may be generated based on the second priority vector and the information about the second port.

In this embodiment of this application, when the second root information includes the second message, the operation of generating a second priority vector may include at least one of the following:

generating the second priority vector based on the second message;

generating the second priority vector based on the second message and the configuration information of the port status;

generating the second priority vector based on the second message and a port status;

generating the second priority vector based on the second message and the information about the second port; and generating, based on the second message and information about a port on the third communications device, a second priority vector corresponding to each port.

In an implementation, the second message includes the information about the egress port, and the second priority vector may be generated directly based on the second message.

In another implementation, the second message includes no port information, the second priority vector may be generated based on the second message and the configuration information of the port status, and a port whose port status is a master port, a designated port, or a sending port is designated as an egress port for the second message.

In another implementation, the second message includes no port information, the second priority vector may be generated based on the second message and a port status (for example, a current state of the port), and a port whose port status is a master port, a designated port, or a sending port is designated as an egress port for the second message.

In another implementation, the second message includes no port information, and the second priority vector may be generated based on the second message and the information about the second port.

Optionally, the target port may include one of the following: an egress port in the second priority vector, an egress port in the second message, a port specified in the information about the second port, a port whose port status is a master port, a designated port, or a sending port, and a port with a second priority vector being superior to or equal to a port priority vector.

Optionally, in a case that the second root information includes the second message and the second message includes no egress port information, the operation of adding egress port information to the obtained second message includes at least one of the following:

adding the information of the second port to the second message as the egress port information;

adding information about a port whose port status is a master port, a designated port, or a sending port to the second message as the egress port information; and adding port information of a port with a second priority vector being superior to or equal to a port priority vector to the second message.

Optionally, in a case that a second condition is satisfied, the third communications device may send the second message to the target port and/or replace the port priority vector of the target port with the second priority vector. The second condition includes that the second priority vector is superior to or equal to the port priority vector of the target port.

In an implementation, the second priority vector is a second priority vector of the target port.

It is easy to understand that according to this embodiment, selection and obtaining of the optimal root object clock (for example, the optimal master clock or the optimal root bridge) under a distributed TT structure of the 5G bridge can be supported.

Referring to FIG. 4, an embodiment of this application provides an information control method, applied to a fourth communications device. The fourth communications device includes but is not limited to one of the following: UE. The method includes the following steps.

Step 51: Receive first root information.

In this embodiment, the first root information may include at least one of the following: a first message, a message priority vector, a port priority vector of a first port, a path priority vector of a first root object, information about the first port, and a path cost of a receiving port.

Step 52: Perform a fourth operation based on the first root information.

Optionally, the fourth operation may include at least one of the following:

sending the first root information through a first data channel; sending the first root information other than the information about the first port through the first data channel; and sending one of the following through the first data channel: a first message, a message priority vector, a port priority vector of the first port, a path priority vector of a first root object, a first message and a path cost of a receiving port, a message priority vector and the path cost of the receiving port, the port priority vector of the first port and the path cost of the receiving port, and the path priority vector of the first root object and the path cost of the receiving port.

In an implementation, the fourth operation includes the operation of sending the first root information other than the information about the first port through the first data channel. It is easy to understand that the information about the first port may be considered to be used for associating with the first data channel by the fourth communications device. The fourth communications device may not need to send the information about the first port.

Optionally, the first data channel is a data channel associated with the first port, or a data channel associated with any DS-TT port.

Optionally, the first port includes a port for receiving the first message.

Optionally, the first message is a message including information about the first root object. For example, the first root object may include at least one of the following: a first master clock and a first root bridge.

In this embodiment of this application, the fourth communications device may further: receive second root information from a second data channel; and perform a seventh operation based on the second root information.

Optionally, the second data channel is a data channel associated with a second port, or a data channel associated with any DS-TT port.

Optionally, the second root information may include at least one of the following: a second message, a second priority vector, information about a second port, and configuration information of a port status.

Optionally, the second port may include at least one of the following: a port for sending the second message, a port for sending the second priority vector, a port for sending the second root information, and a port whose port status is a master port, a designated port, or a sending port.

Optionally, the seventh operation may include at least one of the following:

determining information about a second port based on information about a DS-TT port associated with the second data channel; and sending the second root information and/or the information about the second port to a DS-TT; where It is easy to understand that according to this embodiment, selection and obtaining of the optimal root object clock (for example, the optimal master clock or the optimal root bridge) under a distributed TT structure of the 5G bridge can be supported.

Figure 6:
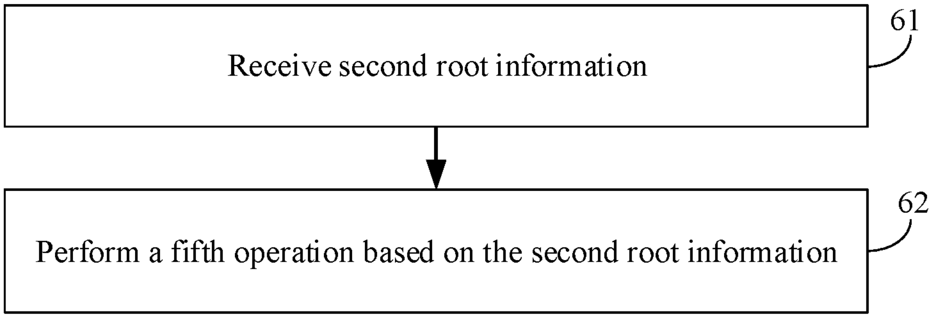
FIG. 6 is a schematic flowchart of another information control method according to an embodiment of this application.

Referring to FIG. 6, an embodiment of this application provides an information control method, applied to a fifth communications device. The fifth communications device includes but is not limited to one of the following: a UPF. The method includes the following steps.

Step 61: Receive second root information.

Optionally, the second root information may include at least one of the following: a second message or a second priority vector, information about a second port, and configuration information of a port status.

Optionally, the second port may include at least one of the following: a port for sending the second message, a port for sending the second priority vector, a port for sending the second root information, and a port whose port status is a master port, a designated port, or a sending port.

Optionally, the second message is a message including information about the optimal root object. The optimal root object may include at least one of the following: an optimal master clock and an optimal root bridge.

Step 62: Perform a fifth operation based on the second root information.

Optionally, the fifth operation includes at least one of the following:

sending the second root information through a second data channel;

sending the second root information other than information about a second port through the second data channel; and sending one of the following through the second data channel: a second message, a second priority vector, the second message and configuration information of a port status, and the second priority vector and the configuration information of the port status; where Optionally, the second data channel is a data channel associated with the second port, or a data channel associated with any DS-TT port.

In an implementation, the fifth operation includes the operation of sending the second root information other than the information about the second port through the second data channel. It is easy to understand that the information about the second port may be considered to be used for associating with the second data channel by the fifth communications device. The fifth communications device may not need to send the information about the second port.

In an implementation, the information about the second port includes an identifier of the second port, for example, a port index of the second port.

In an implementation, the second message includes at least one of the following: information about an optimal root object, a path cost of the optimal root object, and information about an egress port.

Optionally, a path cost of an optimal root object may be a path cost to the optimal root object.

It should be noted that although the second port may be a plurality of ports, one second message can carry only information about only one egress port, that is, carrying information about one second port.

In an implementation, when a plurality of different second messages are generated, each second message may include information about a different egress port, and further the different second messages may be sent to second data channels corresponding to different egress ports.

In another implementation, the second message includes no information about the egress port, but an addition second-port information list is sent, where information about a plurality of second ports may be included. The UPF may copy the second message based on the second port information list, and then sends the second message. After receiving the second message carrying no information about the egress port, the second target end may add the information about the egress port to the second message based on a current state of the port or the configuration information of the port status, and then sends the second message. For example, for a port whose status is a master port state, a designated port state, or a sending port state, information about the port may be added to the second message and sent through the port.

It is easy to understand that according to this embodiment, selection and obtaining of the optimal root object clock (for example, the optimal master clock or the optimal root bridge) under a distributed TT structure of the 5G bridge can be supported.

Figure 7:
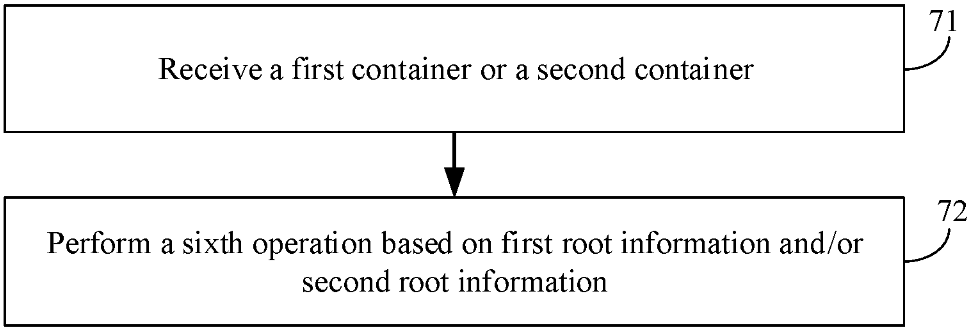
FIG. 7 is a schematic flowchart of another information control method according to an embodiment of this application.

Referring to FIG. 7, an embodiment of this application provides an information control method, applied to a sixth communications device. The sixth communications device includes but is not limited to one of the following: an AF. The method includes the following steps.

Step 71: Receive a first container or a second container.

The first container includes first root information. The first root information may include at least one of the following: a first message, a message priority vector, a port priority vector of a first port, a path priority vector of a first root object, information about the first port, and a path cost of a receiving port. The second container includes second root information. The second root information may include at least one of the following: a second message or a second priority vector, information about a second port, and configuration information of a port status.

Optionally, the first container may include one of the following: a port management information container and a DS-TT management information container;

Optionally, the second container may include one of the following: an NW-TT management information container and a bridge management information container.

Optionally, the configuration information of the port status is used for configuring a status of a port.

Step 72: Perform a sixth operation based on the first root information and/or the second root information.

Optionally, the sixth operation may include at least one of the following:

adding the first root information to the second container for sending; and adding the second root information to the first container for sending.

It should be noted that the second priority vector may be referred to as a designated priority vector or a master priority vector. The second priority vector is an externally sent priority vector.

Optionally, the configuration information of the port status or port status information may include any one of the following: identification information of a port and a state of the port. The state of the port includes one of the following: a master port state (Master), a designated port state, or a sending port state; and a slave port state (Slave) or a receiving port state, a passive port state, and an unavailable port state.

It is easy to understand that according to this embodiment, selection and obtaining of the optimal root object clock (for example, the optimal master clock or the optimal root bridge) under a distributed TT structure of the 5G bridge can be supported.

Figure 8:
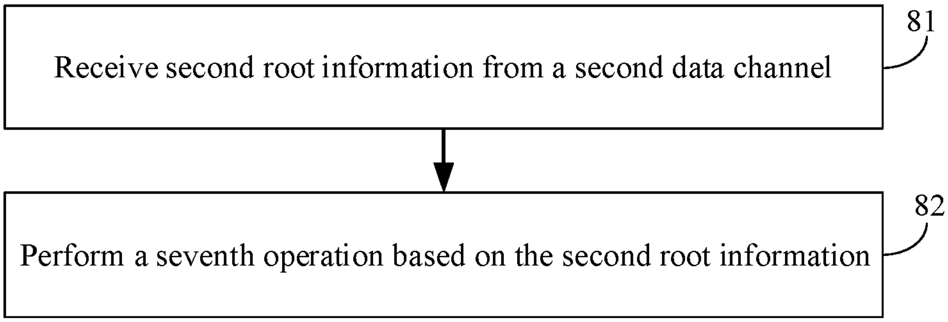
FIG. 8 is a schematic flowchart of another information control method according to an embodiment of this application.

Referring to FIG. 8, an embodiment of this application provides an information control method, applied to a seventh communications device. The seventh communications device includes but is not limited to one of the following: UE. The method includes the following steps.

Step 81: Receive second root information from a second data channel.

In this embodiment, the second data channel is a data channel associated with the second port, or a data channel associated with any DS-TT port.

Optionally, the second root information may include at least one of the following: a second message, a second priority vector, information about a second port, and configuration information of a port status.

Optionally, the second port may include at least one of the following: a port for sending the second message, a port for sending the second priority vector, a port for sending the second root information, and a port whose port status is a master port, a designated port, or a sending port.

Step 82: Perform a seventh operation based on the second root information.

Optionally, the seventh operation may include at least one of the following:

determining information about a second port based on information about a DS-TT port associated with the second data channel; and sending the second root information and/or the information about the second port to a DS-TT.

It is easy to understand that according to this embodiment, selection and obtaining of the optimal root object clock (for example, the optimal master clock or the optimal root bridge) under a distributed TT structure of the 5G bridge can be supported.

The following describes the methods provided in the embodiments of this application with reference to specific application scenarios.

Figure 9:
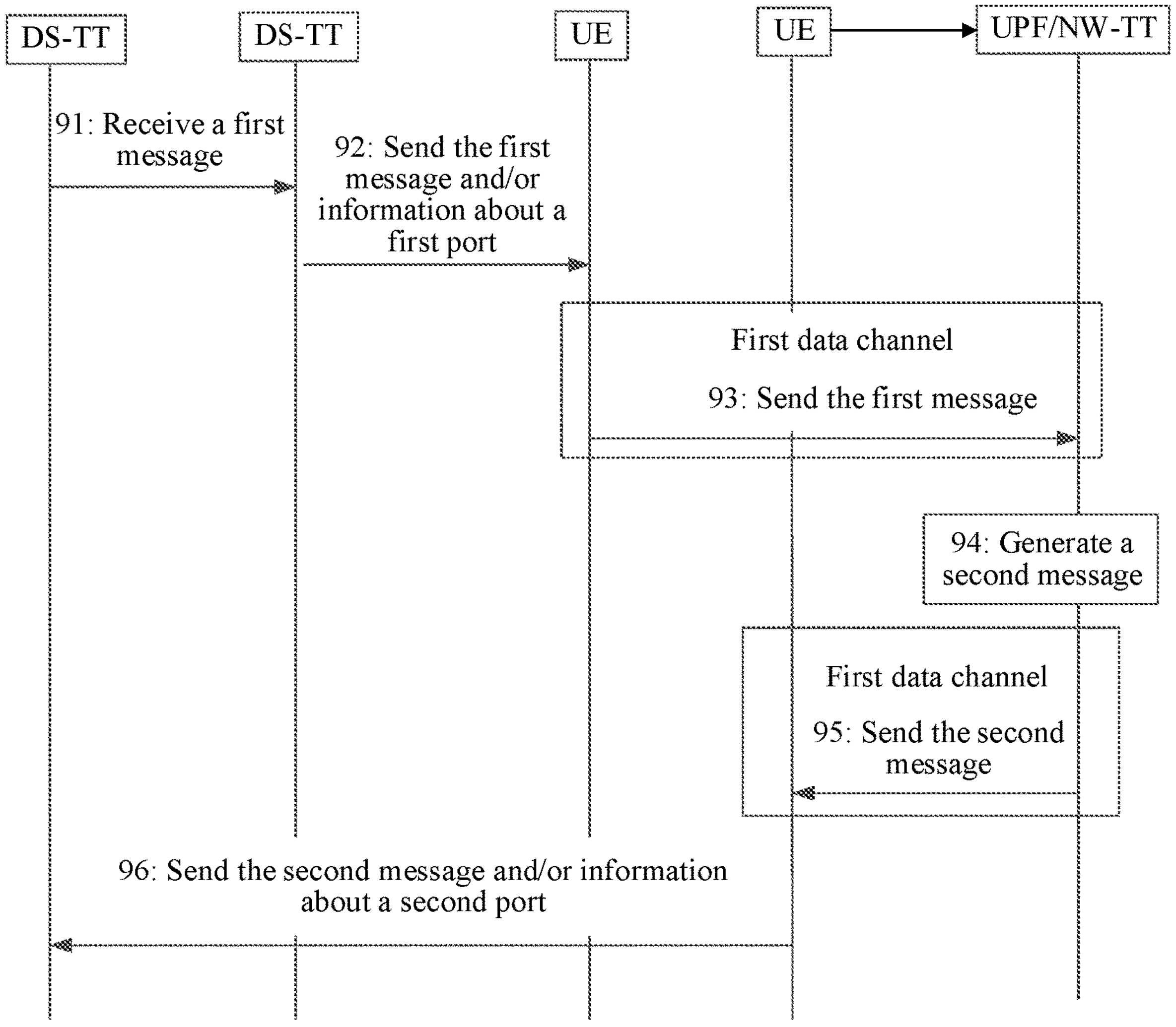
FIG. 9 is a schematic flowchart of an information control method in an application scenario 1 according to an embodiment of this application.

In an application scenario 1, as shown in FIG. 9, the process of determining an optimal clock may include the following steps.

Step 91: ADS-TT receives a first message. Optionally, the first message is a message including information about a first root object, and the first root object includes at least one of the following: a first master clock and a first root bridge.

In an implementation, the first message may include at least one of the following: the information of the first root object, a path cost of the first root object (such as a path cost between a system sending the first message and the first root object), and information about an egress port.

Step 92: The DS-TT sends the first message and/or information about a first port to UE. Optionally, the first port includes a port for receiving the first message.

Step 93: The UE sends the first message to a UPF/NW-TT through a first data channel.

Optionally, the first data channel is a data channel associated with the first port, or a data channel associated with any DS-TT port.

Step 94: The UPF/NW-TT determines an optimal root object based on the received first message, and generates a second message. Optionally, the second message is a message including information about the optimal root object, where the optimal root object includes at least one of the following: optimal master clock information and an optimal root bridge.

Step 95: The UPF/NW-TT sends the second message to the UE through a second data channel.

Optionally, the second data channel is a data channel associated with a second port, or a data channel associated with any DS-TT port. The second port includes one of the following: a port for sending the second message and a port whose status is a master port.

Step 96: The UE sends the second message and/or information about the second port to the DS-TT. The DS-TT sends the second message to a target port. For specific operations, refer to the embodiment in FIG. 4. Details are not repeated herein.

Figure 10:
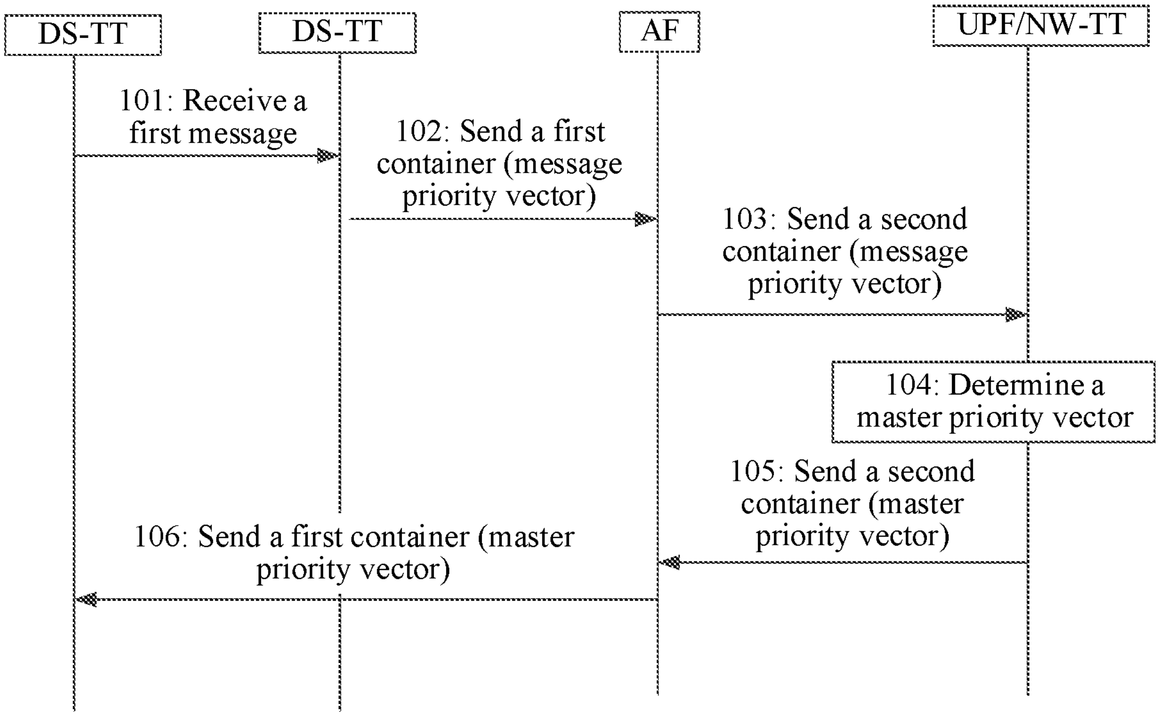
FIG. 10 is a schematic flowchart of an information control method in an application scenario 2 according to an embodiment of this application.

In an application scenario 2, as shown in FIG. 10, the process of determining an optimal clock may include the following steps.

Step 101: ADS-TT receives a first message. Optionally, the first message is a message including information about a first root object, and the first root object includes at least one of the following: a first master clock and a first root bridge.

In an implementation, the first message may include at least one of the following: the information of the first root object, a path cost of the first root object (such as a path cost between a system sending the first message and the first root object), and information about an egress port.

Step 102: The DS-TT sends a first container to an AF.

Optionally, the first container includes first root information. The first root information includes at least one of the following: a first message, a message priority vector, a port priority vector of a first port, a path priority vector of a first root object, information about the first port, and a path cost of a receiving port. The first container includes one of the following: a port management information container and a DS-TT management information container.

Step 103: The AF sends a second container to a UPFNW-TT.

Optionally, the second container includes a first message and a message priority vector. The second container includes one of the following: an NW-TT management information container and a bridge management information container.

Step 104: The UPF/NW-TT determines a master priority vector based on the received first message and/or the message priority vector.

Step 105: The UPF/NW-TT sends a second container to the AF.

Optionally, the second container includes a master priority vector.

Step 106: The AF sends a first container to the DS-TT.

Optionally, the first container includes the master priority vector.

Figure 11:
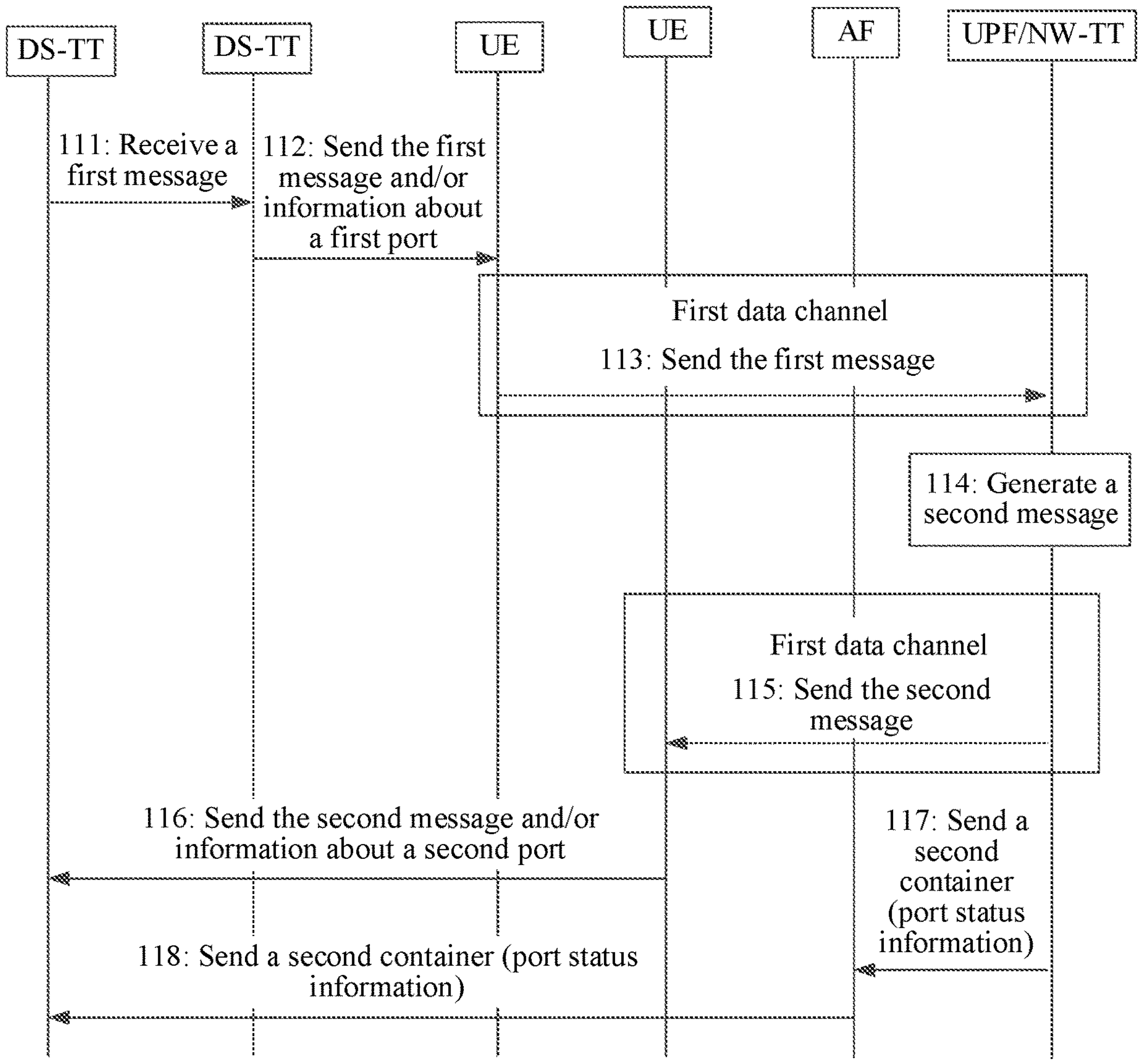
FIG. 11 is a schematic flowchart of an information control method in an application scenario 3 according to an embodiment of this application.

In an application scenario 3, as shown in FIG. 11, the process of determining an optimal clock may include the following steps.

Step 111: A DS-TT receives a first message. Optionally, the first message is a message including information about a first root object, and the first root object includes at least one of the following: a first master clock and a first root bridge.

In an implementation, the first message may include at least one of the following: the information of the first root object, a path cost of the first root object (such as a path cost between a system sending the first message and the first root object), and information about an egress port.

Step 112: The DS-TT sends the first message and/or information about a first port to UE. Optionally, the first port includes a port for receiving the first message.

Step 113: The UE sends the first message to a UPF/NW-TT through a first data channel.

Optionally, the first data channel is a data channel associated with the first port, or a data channel associated with any DS-TT port.

Step 114: The UPF/NW-TT determines an optimal root object based on the received first message, and generates a second message. Optionally, the second message is a message including information about the optimal root object, where the optimal root object includes at least one of the following: optimal master clock information and an optimal root bridge.

Step 115: The UPF/NW-TT sends the second message to the UE through a second data channel.

Optionally, the second data channel is a data channel associated with a second port, or a data channel associated with any DS-TT port. The second port includes one of the following: a port for sending the second message and a port whose status is a master port.

Step 116: The UE sends the second message and/or information about the second port to the DS-TT.

Step 117: The UPF/NW-TT sends a second container to an AF.

Optionally, the second container includes port status information. The second container includes one of the following: an NW-TT management information container and a bridge management information container.

Step 118: The AF sends a second container to the D S-TT. Optionally, the second container includes port status information.

Figure 12:
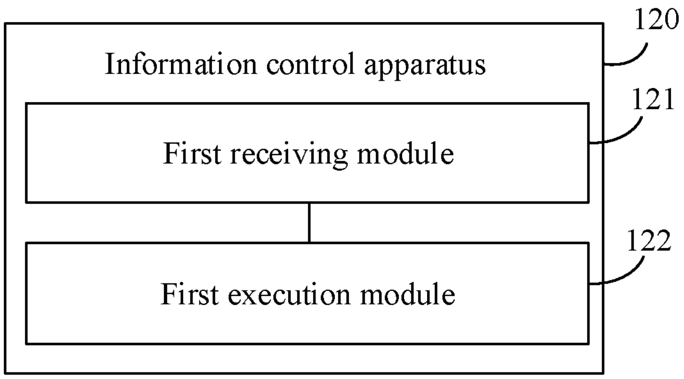
FIG. 12 is a structural diagram of an information control apparatus according to an embodiment of this application.

Referring to FIG. 12, an embodiment of this application provides an information control apparatus, applied to a first communications device. As shown in FIG. 12, the information control apparatus 120 includes:

a first receiving module 121, configured to receive a first message, where the first message is a message including information about a first root object; and a first execution module 122, configured to perform a first operation.

The first operation includes at least one of the following:

generating a message priority vector based on a first port and/or the first message;

discarding the first message; and performing a second-type operation of the first operation; where the second-type operation of the first operation includes at least one of the following:

generating a path priority vector of the first root object based on the first port, the first message, and/or a path cost of a receiving port, or generating a path priority vector of the first root object based on the message priority vector and/or a path cost of a receiving port;

sending first root information to a first target end; and replacing a port priority vector of the first port with the message priority vector.

The first port includes a port for receiving the first message; and the first root information includes at least one of the following: the first message, the message priority vector, the port priority vector of the first port, the path priority vector of the first root object, information about the first port, and the path cost of the receiving port.

Optionally, the first execution module 122 is specifically configured to:

in a case that a first condition is satisfied, perform the second-type operation of the first operation; where the first condition includes that the message priority vector is superior to or equal to the port priority vector of the first port.

Optionally, the first execution module 122 is specifically configured to:

if a second condition is satisfied, discard the first message; and/or, in a case that the second condition is satisfied, skip performing the second-type operation of the first operation; where the second condition includes that the port priority vector of the first port is superior to or equal to the message priority vector.

Optionally, the first root information is included in the second container for sending.

The first container includes one of the following: a port management information container of the first port and a management information container of a device-side time-sensitive networking adapter DS-TT.

Optionally, the first root information is sent to the first target end through a first data channel.

The first data channel is a data channel associated with the first port, or a data channel associated with any DS-TT port.

Optionally, the first target end includes at least one of the following: a terminal, a user plane function UPF, a network side time-sensitive networking adapter NW-TT, and an access function AF.

Optionally, the first receiving module 121 is further configured to obtain second root information, where the second root information includes at least one of the following: a second message or a second priority vector, information about a second port, and configuration information of a port status; and the first execution module 122 is specifically configured to: perform a third operation based on the second root information.

The third operation includes at least one of the following:

adding egress port information to the obtained second message;

generating a second message;

sending the second message to a target port;

generating a second priority vector; and replacing a port priority vector of the target port with a second priority vector, where the second priority vector is the generated second priority vector or the obtained second priority vector.

The second port includes at least one of the following: a port for sending the second message, a port for sending the second priority vector, a port for sending the second root information, and a port whose status is a master port, a designated port, or a sending port; and the second message is a message including information about an optimal root object.

In this embodiment, the information control apparatus 120 is capable of implementing the processes implemented in the method embodiment shown in FIG. 2 of this application, with the same beneficial effects achieved. To avoid repetition, details are not described herein again.

Figure 13:
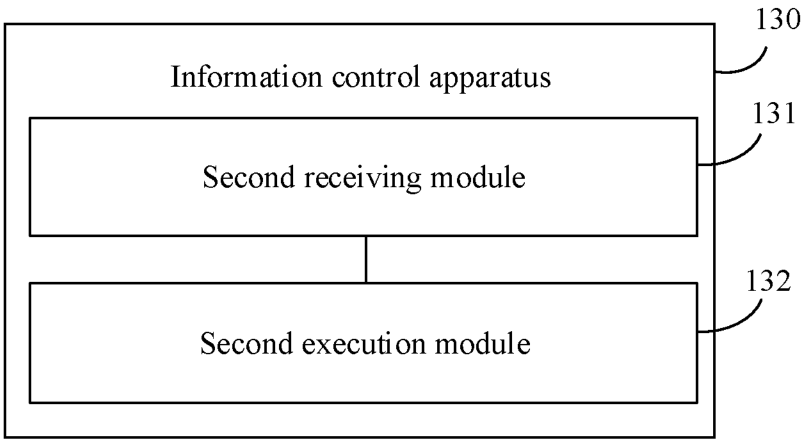
FIG. 13 is a structural diagram of another information control apparatus according to an embodiment of this application.

Referring to FIG. 13, an embodiment of this application provides an information control apparatus, applied to a second communications device. As shown in FIG. 13, the information control apparatus 130 includes:

a second receiving module 131, configured to receive first root information; and a second execution module 132, configured to perform a second operation based on the first root information.

The second operation includes at least one of the following:

generating a message priority vector based on a first message and/or a first port;

generating a path priority vector of a first root object based on the first port, the first message, and/or a path cost of a receiving port, or generating the path priority vector of the first root object based on a message priority vector and/or the path cost of the receiving port, or generating the path priority vector of the first root object based on a port priority vector of the first port and/or the path cost of the receiving port; and performing a second-type operation of the second operation.

The second-type operation of the second operation includes at least one of the following:

determining an optimal root object;

determining second root information; and sending the second root information to a second target end.

The first root information includes at least one of the following: the first message, the message priority vector, the port priority vector of the first port, the path priority vector of the first root object, information about the first port, and the path cost of the receiving port;

the first message is a message including information about the first root object; the first port includes a port for receiving the first message; the second root information includes at least one of the following: a second message, a second priority vector, information about a second port, and configuration information of a port status;

the second message is a message including information about the optimal root object;

the second port includes at least one of the following: a port for sending the second message, a port for sending the second priority vector, a port for sending the second root information, and a port whose status is a master port, a designated port, or a sending port; and the second priority vector is a priority vector that includes the information about the optimal root object.

Optionally, the second execution module 132 is further configured to:

in a case that a first condition is satisfied, perform a second-type operation of the second operation, where the first condition includes at least one of the following: the path priority vector of the first root object is superior to or equal to a system priority vector, and the message priority vector is superior to or equal to the port priority vector of the first port; and/or in a case that a second condition is satisfied, perform an operation of determining the information about the second port, where the second condition includes: a second priority vector of the second port is superior to or equal to a port priority vector of the second port; and/or in a case that a second priority vector of a port is superior to or equal to a port priority vector of the port, set a state of the port to be a master port state, a designated port state, or a sending port state; and/or in a case that a third condition is satisfied, sending the second root information to the second target end; where the third condition includes: the second port is a port on a DS-TT.

Optionally, the second root information is included in a second container for sending.

The second container includes one of the following: an NW-TT management information container and a bridge management information container.

Optionally, the second root information is sent to the second target end through a second data channel.

The second data channel is a data channel associated with the second port, or a data channel associated with any DS-TT port.

Optionally, the second target end includes at least one of the following: a terminal, a UPF, a DS-TT, and an AF.

In this embodiment, the information control apparatus 130 is capable of implementing the processes implemented in the method embodiment shown in FIG. 3 of this application, with the same beneficial effects achieved. To avoid repetition, details are not described herein again.

Figure 14:
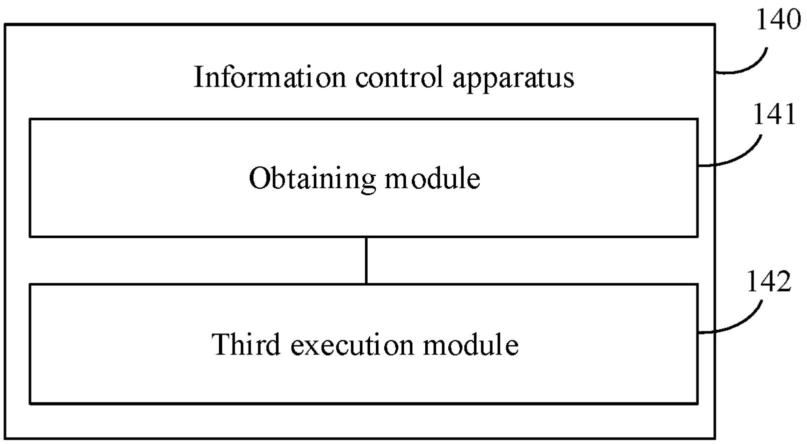
FIG. 14 is a structural diagram of another information control apparatus according to an embodiment of this application.

Referring to FIG. 14, an embodiment of this application provides an information control apparatus, applied to a third communications device. As shown in FIG. 14, the information control apparatus 140 includes:

an obtaining module 141, configured to obtain second root information, where the second root information includes at least one of the following: a second message or a second priority vector, information about a second port, and configuration information of a port status; and a third execution module 142, configured to perform a third operation based on the second root information.

The third operation includes at least one of the following:

adding egress port information to the obtained second message;

generating a second message;

sending the second message to a target port;

generating a second priority vector; and replacing a port priority vector of the target port with a second priority vector, where the second priority vector is the generated second priority vector or the obtained second priority vector.

The second port includes at least one of the following: a port for sending the second message, a port for sending the second priority vector, a port for sending the second root information, and a port whose port status is a master port, a designated port, or a sending port; and the second message is a message including information about an optimal root object.

Optionally, in a case that the second root information includes the second priority vector, the third execution module 142 is further configured to perform one of the following:

generating the second message based on the second priority vector;

generating the second message based on the second priority vector and the configuration information of the port status;

generating the second message based on the second priority vector and a port status;

generating the second message based on the second priority vector and the information about the second port; and generating the second message based on the second priority vector, where an egress port of the second message satisfies a condition that the second priority vector is superior to or equal to a port priority vector of the egress port.

Optionally, in a case that the second root information includes the second message, the third execution module 142 is further configured to perform one of the following:

generating the second priority vector based on the second message;

generating the second priority vector based on the second message and the configuration information of the port status;

generating the second priority vector based on the second message and a port status;

generating the second priority vector based on the second message and the information about the second port; and generating, based on the second message and information about a port on the third communications device, a second priority vector corresponding to each port.

Optionally, the target port includes one of the following: an egress port in the second priority vector, an egress port in the second message, a port specified in the information about the second port, a port whose port status is a master port, a designated port, or a sending port, and a port with a second priority vector being superior to or equal to a port priority vector.

Optionally, in a case that the second root information includes the second message and the second message includes no egress port information, the third execution module 142 is further configured to perform at least one of the following:

adding the information of the second port to the second message as the egress port information;

adding information about a port whose port status is a master port, a designated port, or a sending port to the second message as the egress port information; and adding port information of a port with a second priority vector being superior to or equal to a port priority vector to the second message.

Optionally, the third execution module 142 is further configured to: in a case that a second condition is satisfied, send the second message to the target port and/or replace the port priority vector of the target port with the second priority vector.

The second condition includes that the second priority vector is superior to or equal to the port priority vector of the target port.

In this embodiment, the information control apparatus 140 is capable of implementing the processes implemented in the method embodiment shown in FIG. 4 of this application, with the same beneficial effects achieved. To avoid repetition, details are not described herein again.

Figure 15:
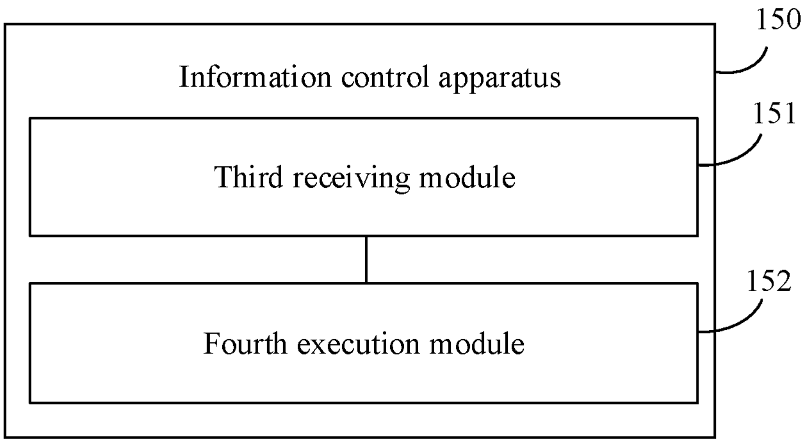
FIG. 15 is a structural diagram of another information control apparatus according to an embodiment of this application.

Referring to FIG. 15, an embodiment of this application provides an information control apparatus, applied to a fourth communications device. As shown in FIG. 15, the information control apparatus 150 includes:

a third receiving module 151, configured to receive first root information; and a fourth execution module 152, configured to perform a fourth operation based on the first root information.

The fourth operation includes at least one of the following:

sending the first root information through a first data channel;

sending the first root information other than information about a first port through the first data channel; and sending one of the following through the first data channel: a first message, a message priority vector, a port priority vector of the first port, a path priority vector of a first root object, a first message and/or a path cost of a receiving port, a message priority vector and the path cost of the receiving port, the port priority vector of the first port and the path cost of the receiving port, and the path priority vector of the first root object and the path cost of the receiving port; where the first root information includes at least one of the following: the first message, the message priority vector, the port priority vector of the first port, the path priority vector of the first root object, the information about the first port, and the path cost of the receiving port.

The first data channel is a data channel associated with the first port, or a data channel associated with any DS-TT port.

The first port includes a port for receiving the first message; and the first message is a message including information about the first root object.

Optionally, the third receiving module 151 is further configured to receive second root information from a second data channel; and the fourth execution module 152 is further configured to: perform a seventh operation based on the second root information.

The seventh operation includes at least one of the following:

determining information about a second port based on information about a DS-TT port associated with the second data channel; and sending the second root information and/or the information about the second port to a DS-TT.

The second data channel is a data channel associated with the second port, or a data channel associated with any DS-TT port;

the second root information includes at least one of the following: a second message, a second priority vector, the information about the second port, and configuration information of a port status; and the second port includes at least one of the following: a port for sending the second message, a port for sending the second priority vector, a port for sending the second root information, and a port whose status is a master port, a designated port, or a sending port.

Figure 5:
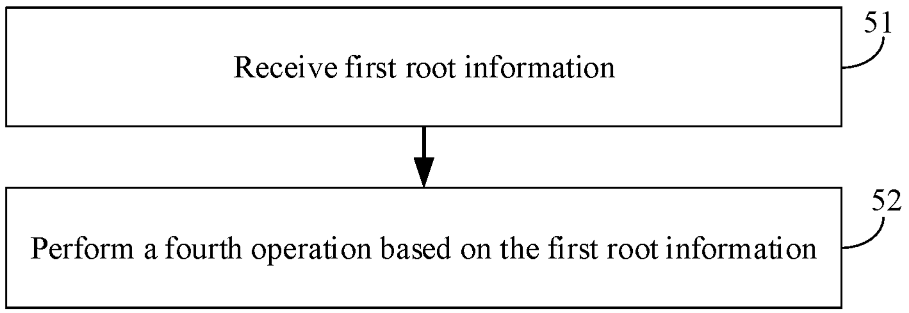
FIG. 5 is a schematic flowchart of another information control method according to an embodiment of this application.

In this embodiment, the information control apparatus 150 is capable of implementing the processes implemented in the method embodiment shown in FIG. 5 of this application, with the same beneficial effects achieved. To avoid repetition, details are not described herein again.

Figure 16:
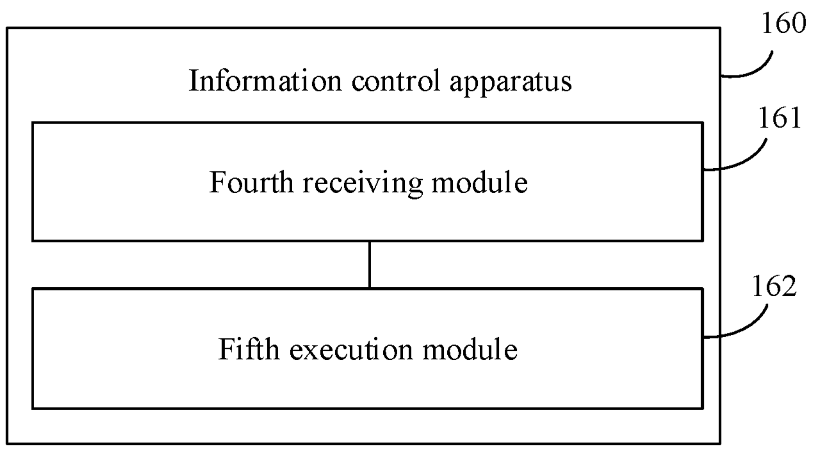
FIG. 16 is a structural diagram of another information control apparatus according to an embodiment of this application.

Referring to FIG. 16, an embodiment of this application provides an information control apparatus, applied to a fifth communications device. As shown in FIG. 16, the information control apparatus 160 includes:

a fourth receiving module 161, configured to receive second root information; and a fifth execution module 162, configured to perform a fifth operation based on the second root information.

The performing a fifth operation includes at least one of the following:

sending the second root information through a second data channel;

sending the second root information other than information about a second port through the second data channel; and sending one of the following through the second data channel: a second message, a second priority vector, the second message and configuration information of a port status, and the second priority vector and the configuration information of the port status.

The second root information includes at least one of the following: the second message or the second priority vector, the information about the second port, and the configuration information of the port status;

the second port includes at least one of the following: a port for sending the second message, a port for sending the second priority vector, a port for sending the second root information, and a port whose status is a master port, a designated port, or a sending port;

the second data channel is a data channel associated with the second port, or a data channel associated with any DS-TT port; and the second message is a message including information about an optimal root object.

Optionally, the configuration information of the port status or port status information includes any one of the following: identification information of a port and a state of the port.

The state of the port includes one of the following: a master port state, a designated port state, or a sending port state; and a slave port state or a receiving port state, a passive port state, and an unavailable port state.

In this embodiment, the information control apparatus 160 is capable of implementing the processes implemented in the method embodiment shown in FIG. 6 of this application, with the same beneficial effects achieved. To avoid repetition, details are not described herein again.

Figure 17:
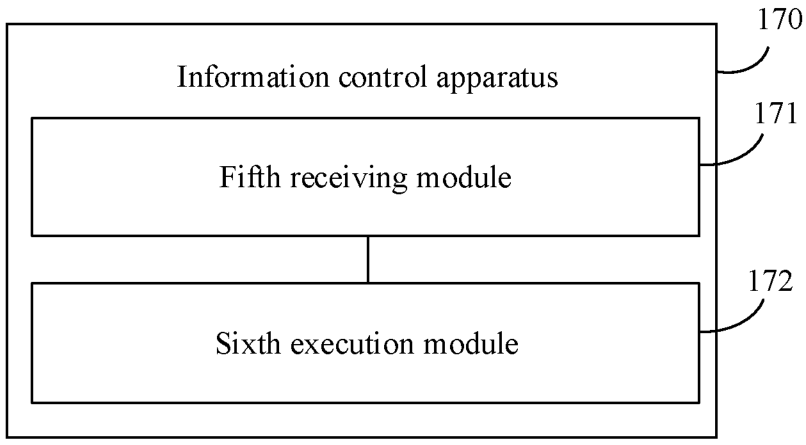
FIG. 17 is a structural diagram of another information control apparatus according to an embodiment of this application.

Referring to FIG. 17, an embodiment of this application provides an information control apparatus, applied to a sixth communications device. As shown in FIG. 17, the information control apparatus 170 includes:

a fifth receiving module 171, configured to receive a first container or a second container, where the first container includes first root information, the first root information includes at least one of the following: a first message, a message priority vector, a port priority vector of a first port, a path priority vector of a first root object, information about the first port, and a path cost of the receiving port, the second container includes second root information, and the second root information includes at least one of the following: a second message or a second priority vector, information about a second port, and configuration information of a port status; and a sixth execution module 172, configured to perform a sixth operation based on the first root information and/or the second root information.

The sixth operation includes at least one of the following:

adding the first root information to the second container for sending; and adding the second root information to the first container for sending; where the first container includes one of the following: a port management information container and a DS-TT management information container;

the second container includes one of the following: an NW-TT management information container and a bridge management information container; and the configuration information of the port status is used for configuring a status of a port.

In this embodiment, the information control apparatus 170 is capable of implementing the processes implemented in the method embodiment shown in FIG. 7 of this application, with the same beneficial effects achieved. To avoid repetition, details are not described herein again.

Figure 18:
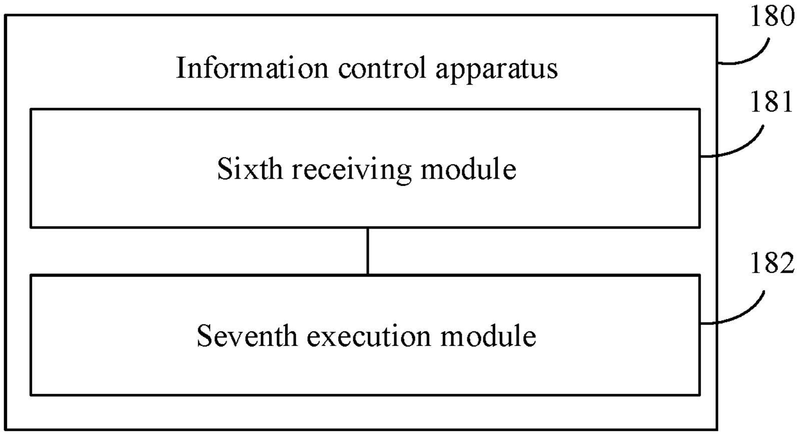
FIG. 18 is a structural diagram of another information control apparatus according to an embodiment of this application.

Referring to FIG. 18, an embodiment of this application provides an information control apparatus, applied to a seventh communications device. As shown in FIG. 18, the information control apparatus 180 includes:

a sixth receiving module 181, configured to receive second root information from a second data channel; and a seventh execution module 182, configured to perform a seventh operation based on the second root information.

The seventh operation includes at least one of the following:

determining information about a second port based on information about a DS-TT port associated with the second data channel; and sending the second root information and/or the information about the second port to a DS-TT.

The second data channel is a data channel associated with the second port, or a data channel associated with any DS-TT port; and the second root information includes at least one of the following: a second message, a second priority vector, the information about the second port, and configuration information of a port status; and the second port includes at least one of the following: a port for sending the second message, a port for sending the second priority vector, a port for sending the second root information, and a port whose port status is a master port, a designated port, or a sending port.

In this embodiment, the information control apparatus 180 is capable of implementing the processes implemented in the method embodiment shown in FIG. 8 of this application, with the same beneficial effects achieved. To avoid repetition, details are not described herein again.

Figure 19:
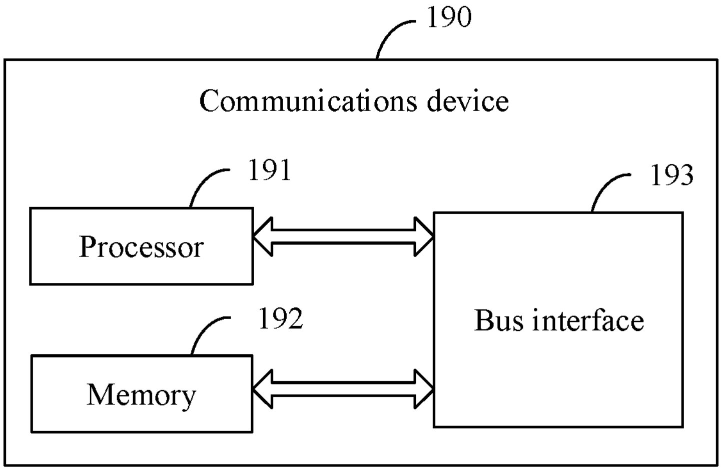
FIG. 19 is a structural diagram of another communications device according to this application.

Referring to FIG. 19, FIG. 19 is a schematic structural diagram of another communications device according to an embodiment of this application. As shown in FIG. 19, the communications device 190 includes a processor 191, a memory 192, and a computer program stored in the memory 192 and capable of running on the processor. The components of the communications device 190 are coupled together by using the bus interface 193. When the computer program is executed by the processor 191, the processes implemented in any one of the method embodiments shown in FIG. 2 to FIG. 8 can be implemented, with the same technical effects achieved. To avoid repetition, details are not described herein again.

An embodiment of this application further provides a computer-readable storage medium, where a computer program is stored in the computer-readable storage medium. When the computer program is executed by a processor, the processes implemented in any one of the method embodiments shown in FIG. 2 to FIG. 8 can be implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An information control method, performed by a first communications device being a device-side time-sensitive network translator (DS-TT), comprising:

receiving a first message, wherein the first message is an announce message in a generalized precision time protocol (gPTP) or an announce message in a precision time protocol (PTP);

performing a first operation, wherein the first operation comprises: sending the first message to a second communications devicefirst target end, wherein the second communications device comprises at least one of a network- side time-sensitive network translator (NW-TT) or a user-plane function (UPF); the first message is used by the second communications device to determine a second message, and the first message is used by the second communications device to determine an optimal master clock; and receiving the second message sent by the second communications device, wherein the second message is an announce message in a gPTP or an announce message in a PTP; and the second message is generated based on the first message.

2. The method according to claim 1, wherein the second communications device further comprises an access function (AF).

3. The method according to claim 1, further comprising:

obtaining second root information, wherein the second root information comprises at least one of the following: a second priority vector, information about a second port, or configuration information of a port status; and performing a third operation based on the second root information or the second message; wherein the third operation comprises at least one of the following:

adding egress port information to the obtained second message;

generating a second message;

sending the second message to a target port;

generating a second priority vector; or replacing a port priority vector of the target port with a second priority vector, wherein the second priority vector is the generated second priority vector or the obtained second priority vector; wherein the second port comprises at least one of the following: a port for sending the second message, a port for sending the second priority vector, a port for sending the second root information, and a port whose port status is a master port, a designated port, or a sending port; and the second message is a message comprising information about an optimal root object.

4. The method according to claim 1, wherein the first operation further comprises at least one of:

generating a message priority vector based on a first port and/or the first message;

discarding the first message;

performing a second-type operation of the first operation; or sending first root information to athe second communications device; wherein the second-type operation of the first operation comprises at least one of the following:

generating a path priority vector of the first root object based on the first port, the first message, and/or a path cost of a receiving port, or generating a path priority vector of the first root object based on the message priority vector and/or a path cost of a receiving port; or replacing a port priority vector of the first port with the message priority vector;

the first root information comprises at least one of the following: the first message, the message priority vector, the port priority vector of a first port, the path priority vector of the first root object, information about the first port, or the path cost of the receiving port;

the first port comprises a port for receiving the first message.

5. The method according to claim 4, wherein the discarding the first message comprises:

in a case that a second condition is satisfied, discarding the first message;

and/or, the method further comprises:

in a case that the second condition is satisfied, skipping performing the second-type operation of the first operation; wherein the second condition comprises that the port priority vector of the first port is superior to or equal to the message priority vector.

6. The method according to claim 1, wherein the first message comprises information about a first master clock, and the second message comprises information about an optimal master clock.

7. The method according to claim 4, wherein the performing a first operation comprises:

in a case that a first condition is satisfied, performing the second-type operation of the first operation; wherein the first condition comprises that the message priority vector is superior to or equal to the port priority vector of the first port.

8. The method according to claim 4, wherein the first root information is comprised in a first container for sending; and the first container comprises one of the following: a port management information container of the first port and a management information container of the DS-TT.

9. The method according to claim 4, wherein the first root information is sent to the second communications device through a first data channel; and the first data channel is a data channel associated with the first port, or a data channel associated with any DS-TT port.

10. An information control method, performed by a second communications device being at least one of a network-side time-sensitive network translator (NW-TT) or a user-plane function (UPF), comprising:

receiving, by the second communications device, a first message from a first communications device being at least one of a device-side time-sensitive network translator (DS-TT) port or a network-side time-sensitive network translator (NW-TT) port; wherein the first message is an announce message in a generalized precision time protocol (gPTP) or an announce message in a precision time protocol (PTP); and performing a second operation based on the first message; wherein the second operation comprises:

determining an optimal master clock;

determining a second message;

sending the second message to the first communications device; wherein the second message is an announce message in a gPTP or an announce message in a PTP.

11. The method according to claim 10, wherein the performing a second operation comprises:

in a case that a second priority vector of a port is superior to or equal to a port priority vector of the port, setting a state of the port to be a master port state, a designated port state, or a sending port state.

12. The method according to claim 10, wherein the second operation further comprises at least one of:

generating a message priority vector based on a first message and/or a first port;

generating a path priority vector of a first root object based on the first port, the first message, and/or a path cost of a receiving port, or generating the path priority vector of the first root object based on a message priority vector and/or the path cost of the receiving port, or generating the path priority vector of the first root object based on a port priority vector of the first port and/or the path cost of the receiving port; or determining a second root information and sending the second root information to the second communications device.

13. The method according to claim 10, wherein the first message comprises information about a first master clock, and the second message comprises information about an optimal master clock.

14. A first communications device, wherein the first communications device is a device-side time-sensitive network translator (DS-TT), and the first communications device comprises a processor, a memory, and a computer program stored on the memory and capable of running on the processor, the processor is configured to read the computer program to perform:

receiving a first message, wherein the first message is an announce message in a generalized precision time protocol (gPTP) or an announce message in a precision time protocol (PTP);

performing a first operation, wherein the first operation comprises: sending the first message to a second communications device, wherein the second communications device comprises at least one of a network-side time-sensitive network translator (NW-TT) or a user-plane function (UPF);

the first message is used by the second communications device to determine a second message, and the first message is used by the second communications device to determine an optimal master clock; and receiving the second message sent by the second communications device, wherein the second message is an announce message in a gPTP or an announce message in a PTP; and the second message is generated based on the first message.

15. The first communications device according to claim 14, wherein the second communications device further comprises an access function (AF).

16. The first communications device according to claim 14, wherein the processor is configured to read the computer program to perform:

obtaining second root information, wherein the second root information comprises at least one of the following: a second priority vector, information about a second port, or configuration information of a port status; and performing a third operation based on the second root information or the second message; wherein the third operation comprises at least one of the following:

adding egress port information to the obtained second message;

generating a second message;

sending the second message to a target port;

generating a second priority vector; or replacing a port priority vector of the target port with a second priority vector, wherein the second priority vector is the generated second priority vector or the obtained second priority vector; wherein the second port comprises at least one of the following: a port for sending the second message, a port for sending the second priority vector, a port for sending the second root information, and a port whose port status is a master port, a designated port, or a sending port; and the second message is a message comprising information about an optimal root object.

17. The first communications device according to claim 14, wherein the first operation further comprises at least one of:

generating a message priority vector based on a first port and/or the first message;

discarding the first message;

performing a second-type operation of the first operation; or sending first root information to the second communications device; wherein the second-type operation of the first operation comprises at least one of the following:

generating a path priority vector of the first root object based on the first port, the first message, and/or a path cost of a receiving port, or generating a path priority vector of the first root object based on the message priority vector and/or a path cost of a receiving port; or replacing a port priority vector of the first port with the message priority vector;

the first root information comprises at least one of the following: the first message, the message priority vector, the port priority vector of a first port, the path priority vector of the first root object, information about the first port, or the path cost of the receiving port;

the first port comprises a port for receiving the first message.

18. The first communications device according to claim 14, wherein the first message comprises information about a first master clock, and the second message comprises information about an optimal master clock.

19. The first communications device according to claim 17, wherein the processor is configured to read the computer program to perform:

in a case that a first condition is satisfied, performing the second-type operation of the first operation; wherein the first condition comprises that the message priority vector is superior to or equal to the port priority vector of the first port.

* * * * *